(12) United States Patent
Spapis et al.

(10) Patent No.: US 12,457,028 B2
(45) Date of Patent: Oct. 28, 2025

(54) BEAM FAILURE RECOVERY ENHANCEMENT

(71) Applicant: Nokia Technologies Oy, Espoo (FI)

(72) Inventors: Panagiotis Spapis, Munich (DE); Alperen Gundogan, Munich (DE); Ahmad Awada, Munich (DE); Ingo Viering, Munich (DE); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 18/259,961

(22) PCT Filed: Dec. 1, 2021

(86) PCT No.: PCT/EP2021/083766
§ 371 (c)(1),
(2) Date: Jun. 29, 2023

(87) PCT Pub. No.: WO2022/152454
PCT Pub. Date: Jul. 21, 2022

(65) Prior Publication Data
US 2024/0073959 A1    Feb. 29, 2024

(30) Foreign Application Priority Data
Jan. 15, 2021  (FI) .................................... 20215053

(51) Int. Cl.
*H04B 7/06* (2006.01)
*H04W 24/04* (2009.01)
(Continued)

(52) U.S. Cl.
CPC ........ *H04B 7/06964* (2023.05); *H04W 24/04* (2013.01); *H04W 74/0833* (2013.01); *H04W 76/19* (2018.02)

(58) Field of Classification Search
CPC .............. H04B 7/06964; H04W 24/04; H04W 74/0833; H04W 76/19; H04W 16/28; H04W 36/305
See application file for complete search history.

(56) References Cited

U.S. PATENT DOCUMENTS

2019/0052342 A1   2/2019  Maattanen et al.
2020/0314711 A1*  10/2020 Basu Mallick . H04W 36/00838
(Continued)

FOREIGN PATENT DOCUMENTS

EP    3666034 A1    6/2020
WO    2019/032017 A1   2/2019
WO    2020/222144 A1   11/2020

OTHER PUBLICATIONS

"Multi-cell beam recovery", 3GPP TSG-RAN WG1 #93, R1-1806221, Agenda: 7.1.2.2.6, Ericsson, May 21-25, 2018, 4 pages. (Year: 2018).*

(Continued)

*Primary Examiner* — Gary Mui
*Assistant Examiner* — Yewon Kim
(74) *Attorney, Agent, or Firm* — Barta Jones, PLLC

(57) ABSTRACT

There are provided measures for beam failure recovery enhancement. Such measures exemplarily comprise, at a terminal, identifying a beam failure with respect to a radio beam provided by a serving cell of said terminal, and deciding, in response to an identified beam failure, to perform beam failure recovery attempts including at least a first beam failure recovery attempt and a second beam failure recovery attempt with respect to said serving cell of said terminal and at least one non-serving cell of said terminal.

3 Claims, 18 Drawing Sheets

(51) Int. Cl.
*H04W 74/0833* (2024.01)
*H04W 76/19* (2018.01)

(56) References Cited

U.S. PATENT DOCUMENTS

| | | | | |
|---|---|---|---|---|
| 2021/0185754 | A1* | 6/2021 | Da Silva | H04W 76/19 |
| 2022/0104300 | A1* | 3/2022 | Ramachandra | H04B 7/0695 |
| 2022/0174567 | A1* | 6/2022 | Awada | H04B 7/06964 |

OTHER PUBLICATIONS

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

"Revised WID: Further enhancements on MIMO for NR", 3GPP TSG RAN Meeting #89e, RP-202024, Agenda: 9.8.1, Samsung, Sep. 14-18, 2020, 5 pages.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"Details on lower-layer mobility enhancements", 3GPP TSG-RAN WG1 Meeting #97, R1-1907435, Agenda: 7.2.12.2, Ericsson, May 13-17, 2019, pp. 1-8.

"Lower-layer mobility enhancements", 3GPP TSG-RAN WG1 Meeting #98bis, R1-1911226, Agenda: 7.2.12.2, Ericsson, Oct. 14-20, 2019, pp. 1-10.

"Lower-layer mobility enhancements", 3GPP TSG-RAN WG1 Meeting #96, R1-1902528, Agenda: 7.2.12.2, Ericsson, Feb. 25-Mar. 1, 2019, pp. 1-8.

"Lower-layer mobility enhancements", 3GPP TSG-RAN WG1 Meeting #99, R1-1912060, Agenda: 7.2.12.2, Ericsson, Nov. 18-22, 2019, pp. 1-10.

"Details on lower-layer mobility enhancements", 3GPP TSG-RAN WG1 Meeting #98, R1-1909227, Agenda: 7.2.12.2, Ericsson, Aug. 26-30, 2019, pp. 1-8.

"Multi-cell beam recovery", 3GPP TSG RAN WG1 Meeting 90bis, R1-1718740, Agenda: 7.2.2.6, Ericsson, Oct. 9-13, 2017, 5 pages.

"Multi-cell beam recovery", 3GPP TSG-RAN WG1 #91, R1-1720719, Agenda: 7.2.2.6, Ericsson, Nov. 27-Dec. 1, 2017, 5 pages.

"Msc-generator", Sourceforge, Retrieved on Jul. 4, 2023, Webpage available at : https://sourceforge.net/projects/msc-generator/.

Office action received for corresponding Finnish Patent Application No. 20215053, dated Apr. 6, 2021, 7 pages.

"The Necessity of T312 in NR", 3GPP TSG-RAN WG2 #103bis, R2-1815359, Agenda: 10.4.1.3.11, Samsung, Oct. 8-12, 2018, 17 pages.

Office action received for corresponding Finnish Patent Application No. 20215053, dated Aug. 23, 2021, 5 pages.

International Search Report and Written Opinion received for corresponding Patent Cooperation Treaty Application No. PCT/EP2021/083766, dated Mar. 23, 2022, 13 pages.

Elmali et al., "Analysis and Performance of Beam Management in 5G Networks", IEEE 30th Annual International Symposium on Personal, Indoor and Mobile Radio Communications (PIMRC), Sep. 8-11, 2019, 7 pages.

* cited by examiner

BEAM FAILURE RECOVERY ENHANCEMENT

RELATED APPLICATION

This application was originally filed as a Patent Cooperation Treaty Application No. PCT/EP2021/083766 filed on Dec. 1, 2021, which claims priority from FI application No. 20215053, filed on Jan. 15, 2021, each of which is incorporated herein by reference in its entirety.

FIELD

Various example embodiments relate to beam failure recovery enhancement. More specifically, various example embodiments exemplarily relate to measures (including methods, apparatuses and computer program products) for realizing beam failure recovery enhancement.

BACKGROUND

The present specification generally relates to beam failure recovery (BFR) and in particular to BFR in Third Generation Partnership Project (3GPP) 5th Generation (5G) New Radio (NR), where the gNodeB (gNB) is equipped with a grid of beams. The present specification more particularly aims to enhance a BFR procedure. Some aspects of the present specification are linked to the 3GPP NR Work Item "Further enhancements on MIMO for NR".

Rel-15 NR introduced a number of multiple input-multiple output (MIMO) features that facilitate utilization of a large number of antenna elements at a base station for both sub-6 GHz and over-6 GHz frequency bands. Rel-16 NR introduced further enhancements for multi-beam operation including reduction in latency and/or overhead for various reconfigurations (quasi co location (QCL) related, measurements), serving cell (SCell) BFR, and L1 signal to interference plus noise ratio (L1-SINR). It is expected that in terms of Rel-17 and later releases, further enhancements are required to be introduced in order to facilitate provisioning and commercialization of NR.

Namely, various aspects that require further enhancements can be identified from real deployment scenarios. Such aspects include, for example, that, while Rel-16 manages to offer some reduction in overhead and/or latency, high-speed vehicular scenarios (e.g. a user equipment (UE) traveling at high speed on highways) at frequency range 2 (FR2) require more aggressive reduction in latency and overhead—not only for intra-cell, but also for L1/L2 centric inter-cell mobility. This also includes reducing the occurrence of beam failure events.

In the context of the above statement, further enhancements on MIMO for NR (NR_FeMIMO) targets enhancements on multi-beam operation, mainly targeting FR2, and specify higher layer support for such enhancements.

In the current 3GPP NR specifications, i.e. Rel 15, once a beam failure is identified by counting beam failure instance indications from the lower layers to the medium access control (MAC) entity, a UE will proceed in BFR only to its serving cell. However, it has been observed that the success rate of BFR to a serving cell decreases as UE speed increases. Additionally, the success rate of BFR to serving cell beams decreases at cell borders.

In case the BFR procedure fails, the UE will declare a radio link failure (RLF) and it will start searching candidate beams for connection re-establishment. These beams may come from the serving or a non-serving cell. However, declaring RLF and initiating connection re-establishment increases the interruption time.

Apart from the current 3GPP NR specifications, where the UE performs BFR to the serving cell, it might be considered for the UE to perform BFR to a non-serving cell instead of to the serving one. In such case, the UE, instead of picking a beam from the serving cell, may pick one from a non-serving cell. According to such consideration based on the current 3GPP NR specifications, in case the BFR fails, the UE will declare RLF and proceed as outlined above (i.e. declaring RLF and initiating connection re-establishment).

That is, according to the current 3GPP NR specifications and further considerations as outlined above, the UE may decide to perform BFR to the serving cell or to a non-serving cell, e.g. based on L1-RSRP measurements which change very fast.

If the UE performs BFR to the serving cell, the UE would risk wasting the random access channel (RACH) attempts to a cell that it is already bad, since it had beam failure. Then, in case of a failure of the BFR, the UE will have to declare RLF and start connection re-establishment, which will increase the service interruption.

On the other hand, if the UE performs BFR to a non-serving cell, the UE would perform a signaling-costly and time-consuming procedure to a cell which may or may not be prepared beforehand. In case the (non-serving) cell is not prepared beforehand, it would have to retrieve user context from the serving cell. This is even more relevant as the BFR to a non-serving cell might be unnecessary if the UE could still have a chance to perform BFR in the serving cell. The BFR may use contention free random access (CFRA) or contention based random access (CBRA). In case of CFRA, random access preambles would have to be reserved in multiple cells that could serve the UE resulting in resource waste. In case of CBRA, the UE would use preambles that have not been reserved, thus risking delays due to collisions.

A further implication of following the current 3GPP NR specifications for a in BFR procedure is related to the maximum permissible exposure (MPE) impacts the RACH process. When the UE performs RACH attempts to the serving cell, the RACH attempts may be impacted due to reduced uplink power (and blockage) when UE applies MPE power management maximum power reduction (P-MPR). In such case, the UE would have to wait for maxTransmissionAttempts to be completed before it declares RLF even in case it is apparent that the UE cannot reach the network with the reduced uplink power due to MPE FR2 requirements.

Hence, in view of the above, the problem arises that despite undertaking potentially unnecessary, signaling-costly, and time-consuming random access channel (RACH) attempts, connection re-establishments may not be avoided, resulting in an increase of service interruption.

Hence, there is a need to provide for beam failure recovery enhancement.

SUMMARY

Various example embodiments aim at addressing at least part of the above issues and/or problems and drawbacks.

Various aspects of example embodiments are set out in the appended claims.

According to an example aspect, there is provided a method of a terminal, comprising identifying a beam failure with respect to a radio beam provided by a serving cell of said terminal, and deciding, in response to an identified beam failure, to perform beam failure recovery attempts including at least a first beam failure recovery attempt and a second beam failure recovery attempt with respect to said serving cell of said terminal and at least one non-serving cell of said terminal.

According to an example aspect, there is provided a method of a network entity controlling network access for a terminal, comprising deciding on a beam failure handling decision configuration for said terminal, and controlling transmission of said beam failure handling decision configuration to said terminal, wherein said beam failure handling decision configuration configures a deciding behavior of said terminal regarding performance of beam failure recovery attempts with respect to a serving cell of said terminal and at least one non-serving cell of said terminal.

According to an example aspect, there is provided an apparatus of a terminal, comprising identifying circuitry configured to identify a beam failure with respect to a radio beam provided by a serving cell of said terminal, and deciding circuitry configured to decide, in response to an identified beam failure, to perform beam failure recovery attempts including at least a first beam failure recovery attempt and a second beam failure recovery attempt with respect to said serving cell of said terminal and at least one non-serving cell of said terminal.

According to an example aspect, there is provided an apparatus of a network entity controlling network access for a terminal, comprising deciding circuitry configured to decide on a beam failure handling decision configuration for said terminal, and controlling circuitry configured to control transmission of said beam failure handling decision configuration to said terminal, wherein said beam failure handling decision configuration configures a deciding behavior of said terminal regarding performance of beam failure recovery attempts with respect to a serving cell of said terminal and at least one non-serving cell of said terminal.

According to an example aspect, there is provided an apparatus of a terminal, comprising at least one processor, at least one memory including computer program code, and at least one interface configured for communication with at least another apparatus, the at least one processor, with the at least one memory and the computer program code, being configured to cause the apparatus to perform identifying a beam failure with respect to a radio beam provided by a serving cell of said terminal, and deciding, in response to an identified beam failure, to perform beam failure recovery attempts including at least a first beam failure recovery attempt and a second beam failure recovery attempt with respect to said serving cell of said terminal and at least one non-serving cell of said terminal.

According to an example aspect, there is provided an apparatus of a network entity controlling network access for a terminal, comprising at least one processor, at least one memory including computer program code, and at least one interface configured for communication with at least another apparatus, the at least one processor, with the at least one memory and the computer program code, being configured to cause the apparatus to perform deciding on a beam failure handling decision configuration for said terminal, and controlling transmission of said beam failure handling decision configuration to said terminal, wherein said beam failure handling decision configuration configures a deciding behavior of said terminal regarding performance of beam failure recovery attempts with respect to a serving cell of said terminal and at least one non-serving cell of said terminal.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient reduction of connection re-establishments in case of RLFs and consequently an efficient shortening of service interruptions to thereby solve at least part of the problems and drawbacks identified in relation to the prior art.

By way of example embodiments, there is provided beam failure recovery enhancement. More specifically, by way of example embodiments, there are provided measures and mechanisms for realizing beam failure recovery enhancement.

Thus, improvement is achieved by methods, apparatuses and computer program products enabling/realizing beam failure recovery enhancement.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
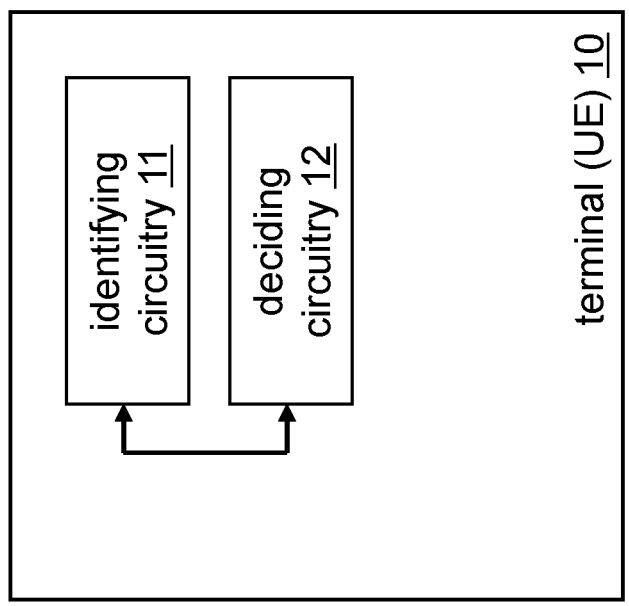
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) beam failure recovery enhancement.

From the above analysis of the background art, it can be concluded that it might be beneficial that the UE prioritizes the BFR to the serving cell and to, at the same time, enable the UE to perform BFR to non-serving cells as well.

Thus, in general terms, according to example embodiments, the network is facilitated to configure the UE to recover upon beam failure detection to multiple cells including the serving cell, while the UE decides to recover and attempts to recover based on such configuration.

In these general terms, according to example embodiments, the UE may attempt recovery in one BFR period for both serving cell and non-serving cells. In this case, the UE is configured to perform BFR to the serving cell and to non-serving cells in one (identical) BFR period. The network may configure the number of RACH attempts to be performed per serving and non-serving cell using e.g. a RACH ConfigGeneric information element of the radio resource control (RRC) reconfiguration message. Then, the UE may perform BFR using sequential or parallel RACH attempts.

Alternatively, in these general terms, according to example embodiments, the UE may attempt recovery in one BFR period for the serving cell that is followed by other BFR periods for each of the selected non-serving cells. In this case, the UE may be configured with multiple BFR periods, one for the serving cell and one for each of the non-serving cells. The network may configure the UE to suppress the declaration of RLF at all the BFR periods except from the last one. The network may configure BFR procedures using e.g. a RACH ConfigGeneric information element of the RRC reconfiguration message. The UE may perform BFR using sequential or parallel RACH attempts. According to example embodiments, only one BFR period is configured for non-serving cells. Within this BFR period, the UE can attempt RACH to a same non-serving cell or to different non-serving cells.

According to example embodiments outlined above in general terms, further, a cell prioritization algorithm may be applied. According thereto, the UE may decide which cell to prioritize for the BFR using multiple inputs, e.g., availability of UE context, availability of CFRA resources, blockage of particular panels and application of MPE, etc.

As mentioned above, the UE may perform BFR using sequential RACH attempts to multiple cells, or, in order to facilitate faster recovery, using parallel RACH attempts to more than one cell, using multiple panels, thus reducing the interruption time. The number of available panels may limit the attempts that can be performed in parallel.

Exemplary embodiments are described below in different terms.

Figure 4:
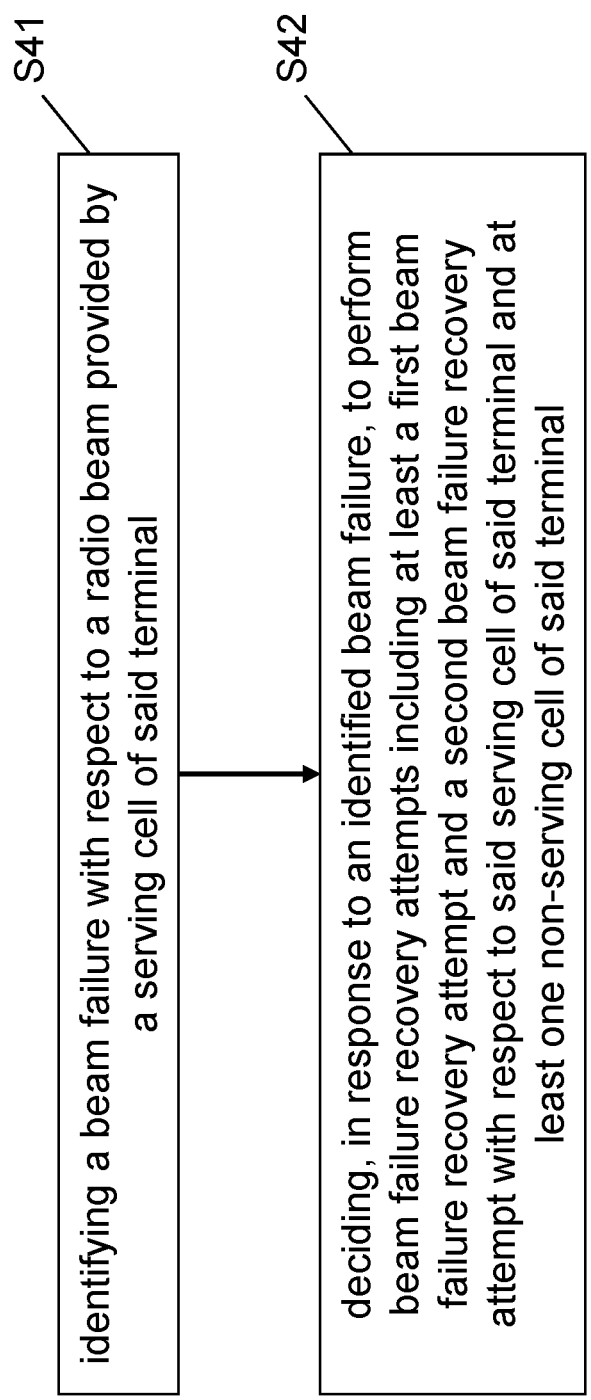
FIG. 4 is a schematic diagram of a procedure according to example embodiments.

FIG. 1 is a block diagram illustrating an apparatus according to example embodiments. The apparatus may be a terminal 10 such as a user equipment comprising an identifying circuitry 11 and a deciding circuitry 12. The identifying circuitry 11 identifies a beam failure with respect to a radio beam provided by a serving cell of said terminal. The deciding circuitry 12 decides, in response to an identified beam failure, to perform beam failure recovery attempts including at least a first beam failure recovery attempt and a second beam failure recovery attempt with respect to said serving cell of said terminal and at least one non-serving cell of said terminal. FIG. 4 is a schematic diagram of a procedure according to example embodiments. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to example embodiments comprises an operation of identifying (S41) a beam failure with respect to a radio beam provided by a serving cell of said terminal, and an operation of deciding (S42), in response to an identified beam failure, to perform beam failure recovery attempts including at least a first beam failure recovery attempt and a second beam failure recovery attempt with respect to said serving cell of said terminal and at least one non-serving cell of said terminal.

Figure 2:
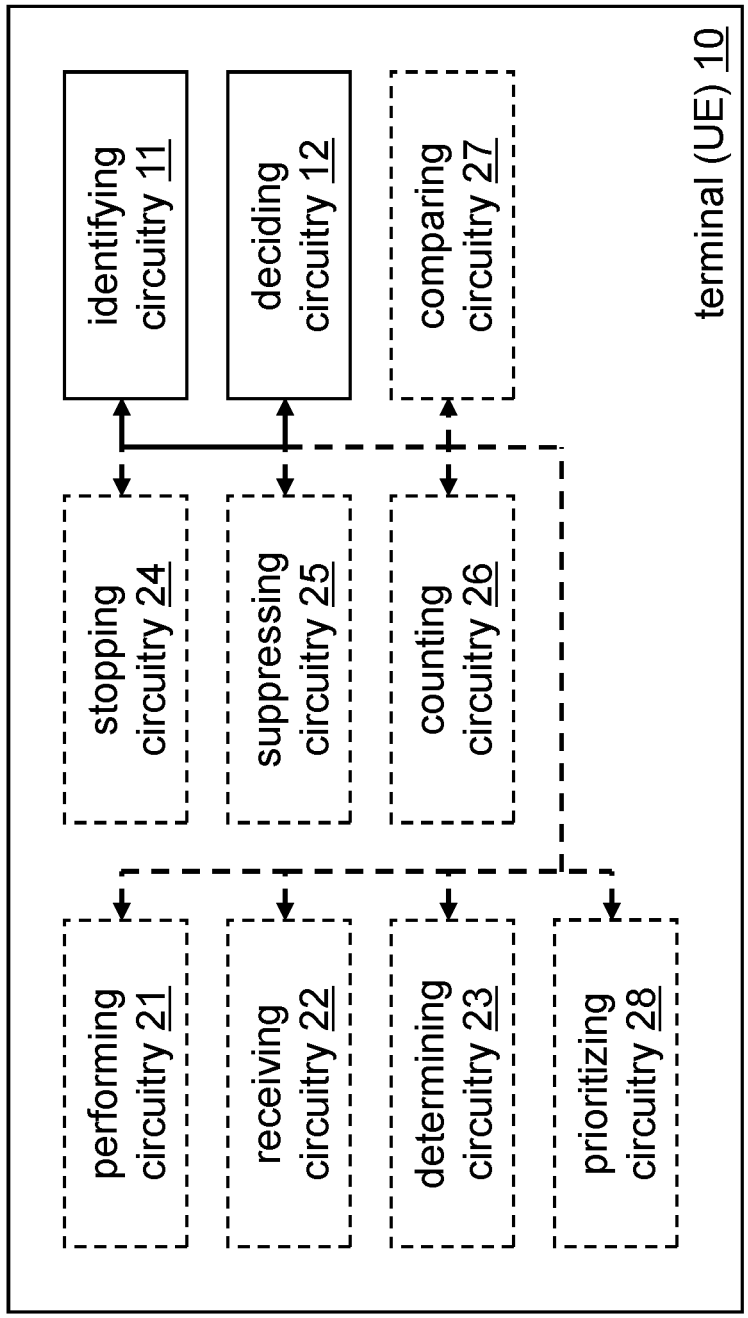
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise performing circuitry 21, receiving circuitry 22, determining circuitry 23, stopping circuitry 24, suppressing circuitry 25, counting circuitry 26, comparing circuitry 27, and/or prioritizing circuitry 28.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 4, exemplary additional operations are given, which are inherently independent from each other as such. According to such variation, an exemplary method according to example embodiments may comprise an operation of performing, based on said deciding, said first beam failure recovery attempt with respect to said serving cell of said terminal within a first beam failure recovery period.

According to a variation of the procedure shown in FIG. 4, exemplary additional operations are given, which are inherently independent from each other as such. According to such variation, an exemplary method according to example embodiments may comprise an operation of performing, based on said deciding, said second beam failure recovery attempt with respect to a first non-serving cell of said at least one non-serving cell of said terminal within a second beam failure recovery period.

According to a variation of the procedure shown in FIG. 4, exemplary additional operations are given, which are inherently independent from each other as such. According to such variation, an exemplary method according to example embodiments may comprise an operation of performing, based on said deciding, said first beam failure recovery attempt with respect to a first non-serving cell of said at least one non-serving cell of said terminal within a first beam failure recovery period.

According to a variation of the procedure shown in FIG. 4, exemplary additional operations are given, which are inherently independent from each other as such. According to such variation, an exemplary method according to example embodiments may comprise an operation of performing, based on said deciding, said second beam failure recovery attempt with respect to said serving cell of said terminal within a second beam failure recovery period.

According to further example embodiments, said first beam failure recovery period is identical with said second beam failure recovery period.

According to still further example embodiments, said second beam failure recovery attempt is performed in parallel with said first beam failure recovery attempt.

According to still further example embodiments, said second beam failure recovery attempt is performed subsequent to said first beam failure recovery attempt.

According to a variation of the procedure shown in FIG. 4, exemplary additional operations are given, which are inherently independent from each other as such. According to such variation, an exemplary method according to example embodiments may comprise an operation of receiving a beam failure handling decision configuration, wherein said deciding is based on said beam failure handling decision configuration.

According to still further example embodiments, said beam failure handling decision configuration comprises a serving cell attempts number of random access channel attempts to be used for beam failure recovery endeavor with respect to said serving cell of said terminal.

According to still further example embodiments, said beam failure handling decision configuration comprises a non-serving cell attempts number of random access channel attempts to be used for beam failure recovery endeavor with respect to said at least one non-serving cell of said terminal.

According to still further example embodiments, said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

According to still further example embodiments, said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

According to still further example embodiments, said beam failure handling decision configuration is a random access channel ConfigGeneric information element.

According to still further example embodiments, said second beam failure recovery period follows said first beam failure recovery period.

According to a variation of the procedure shown in FIG. 4, exemplary additional operations are given, which are inherently independent from each other as such. According to such variation, an exemplary method according to example embodiments may comprise an operation of performing, based on said deciding, a third beam failure recovery attempt with respect to a second non-serving cell of said at least one non-serving cell of said terminal within a third beam failure recovery period.

According to still further example embodiments, said first beam failure recovery period is identical with said third beam failure recovery period.

According to still further example embodiments, said third beam failure recovery attempt is performed in parallel with said first beam failure recovery attempt.

According to still further example embodiments, said second beam failure recovery period is identical with said third beam failure recovery period.

According to still further example embodiments, said third beam failure recovery attempt is performed in parallel with said second beam failure recovery attempt.

According to still further example embodiments, said third beam failure recovery period follows said second beam failure recovery period.

According to a variation of the procedure shown in FIG. 4, exemplary additional operations are given, which are inherently independent from each other as such. According to such variation, an exemplary method according to example embodiments may comprise an operation of receiving a beam failure handling decision configuration, wherein said deciding is based on said beam failure handling decision configuration.

According to still further example embodiments, said beam failure handling decision configuration comprises a serving cell attempts number of random access channel attempts to be used for beam failure recovery endeavor with respect to said serving cell of said terminal.

According to still further example embodiments, said beam failure handling decision configuration comprises a non-serving cell attempts number of random access channel attempts to be used for beam failure recovery endeavor with respect to said at least one non-serving cell of said terminal.

According to still further example embodiments, said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

According to still further example embodiments, said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

According to still further example embodiments, said beam failure handling decision configuration comprises an indication to suppress declaration of radio link failure and initiation of connection re-establishment until a last decided beam failure recovery attempt fails.

According to still further example embodiments, said beam failure handling decision configuration is a random access channel ConfigGeneric information element.

According to a variation of the procedure shown in FIG. 4, exemplary additional operations are given, which are inherently independent from each other as such. According to such variation, an exemplary method according to example embodiments may comprise an operation of determining a priority order between said first beam failure recovery attempt and said second beam failure recovery attempt based on at least one of availability of contention free random access based attempts with respect to respective cells, transmission power limitation towards said respective cells, and predetermined priority rules with respect to said respective cells.

According to a variation of the procedure shown in FIG. 4, exemplary additional operations are given, which are inherently independent from each other as such. According to such variation, an exemplary method according to example embodiments may comprise an operation of prioritizing, if said terminal is not configured with contention free random access resources, said serving cell. Alternatively, or in addition, according to such variation, an exemplary method according to example embodiments may comprise an operation of prioritizing, if said terminal is configured with contention free random access resources, and said configured contention free random access resources do not exceed a predetermined threshold, said serving cell. Alternatively, or in addition, according to such variation, an exemplary method according to example embodiments may comprise an operation of prioritizing, if said terminal is configured with contention free random access resources, and said configured contention free random access resources exceed said predetermined threshold for said serving cell, and said configured contention free random access resources do not exceed said predetermined threshold for a selected non-serving cell, said serving cell. Alternatively, or in addition, according to such variation, an exemplary method according to example embodiments may comprise an operation of prioritizing, if said terminal is configured with contention free random access resources, and said configured contention free random access resources exceed said predetermined threshold for the serving cell and for said selected non-serving cell, said serving cell. Alternatively, or in addition, according to such variation, an exemplary method according to example embodiments may comprise an operation of prioritizing, if said terminal is configured with contention free random access resources, and said configured contention free random access resources do not exceed said predetermined threshold for said serving cell, and said configured contention free random access resources exceed said predetermined threshold for said selected non-serving cell, said selected non-serving cell.

According to a variation of the procedure shown in FIG. 4, exemplary additional operations are given, which are inherently independent from each other as such. According to such variation, an exemplary method according to example embodiments may comprise an operation of receiving a random access channel response in relation to beam failure recovery endeavor with respect to said serving cell of said terminal and/or in relation to beam failure recovery endeavor with respect to said at least one non-serving cell of said terminal, and an operation of stopping performance of beam failure recovery attempts with respect to said serving cell of said terminal and said at least one non-serving cell of said terminal.

According to a variation of the procedure shown in FIG. 4, exemplary additional operations are given, which are inherently independent from each other as such. According to such variation, an exemplary method according to example embodiments may comprise an operation of suppressing declaration of radio link failure and initiation of connection re-establishment until a last decided beam failure recovery attempt fails.

According to a variation of the procedure shown in FIG. 4, exemplary details of the identifying operation (S41) are given, which are inherently independent from each other as such.

Such exemplary identifying operation (S41) according to example embodiments may comprise an operation of counting beam failure instance indications, and an operation of comparing said counted beam failure instance indications with a predetermined beam failure instance indications threshold.

Figure 3:
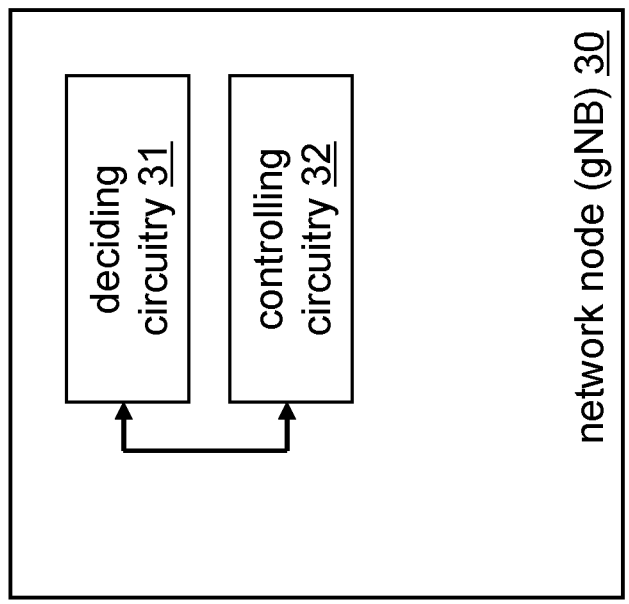
FIG. 3 is a block diagram illustrating an apparatus according to example embodiments.
Figure 5:
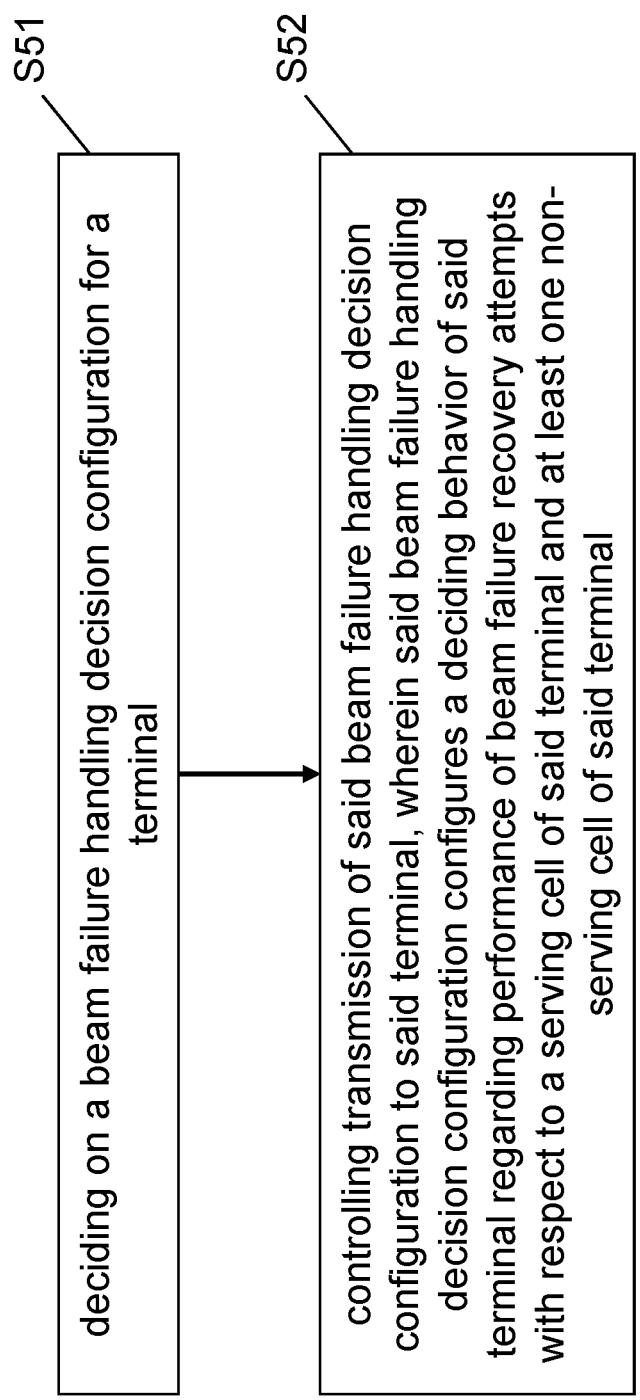
FIG. 5 is a schematic diagram of a procedure according to example embodiments.

FIG. 3 is a block diagram illustrating an apparatus according to example embodiments. The apparatus may be an access node 30 such as a base station (controlling network access for a terminal) comprising a deciding circuitry 31 and a controlling circuitry 32. The deciding circuitry 31 decides on a beam failure handling decision configuration for said terminal. The controlling circuitry 32 controls transmission of said beam failure handling decision configuration to said terminal. Here, said beam failure handling decision configuration configures a deciding behavior of said terminal regarding performance of beam failure recovery attempts with respect to a serving cell of said terminal and at least one non-serving cell of said terminal. FIG. 5 is a schematic diagram of a procedure according to example embodiments. The apparatus according to FIG. 3 may perform the method of FIG. 5 but is not limited to this method. The method of FIG. 5 may be performed by the apparatus of FIG. 3 but is not limited to being performed by this apparatus.

As shown in FIG. 5, a procedure according to example embodiments comprises an operation of deciding (S51) on a beam failure handling decision configuration for said terminal, and an operation of controlling (S52) transmission of said beam failure handling decision configuration to said terminal, wherein said beam failure handling decision configuration configures a deciding behavior of said terminal regarding performance of beam failure recovery attempts with respect to a serving cell of said terminal and at least one non-serving cell of said terminal.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further example embodiments, said beam failure handling decision configuration comprises a serving cell attempts number of random access channel attempts to be used for beam failure recovery endeavor with respect to said serving cell of said terminal.

According to still further example embodiments, said beam failure handling decision configuration comprises a non-serving cell attempts number of random access channel attempts to be used for beam failure recovery endeavor with respect to said at least one non-serving cell of said terminal.

According to still further example embodiments, said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

According to still further example embodiments, said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

According to still further example embodiments, said beam failure handling decision configuration comprises an indication to suppress declaration of radio link failure and initiation of connection re-establishment until a last decided beam failure recovery attempt fails.

According to still further example embodiments, said beam failure handling decision configuration is a random access channel ConfigGeneric information element.

Example embodiments are described below in more detail.

In particular, according example embodiments, one BFR period may be used for the serving cell and non-serving cells.

In detail, according to example embodiments, the UE may attempt recovery in one BFR period for the serving cell and non-serving cells (i.e., one non-serving cell or multiple non-serving cells).

In the case the network configures the UE to perform BFR to the serving cell and to one non-serving cell, the network may provide to the UE (based on various criteria, e.g., inter-cell measurement reports, intra-cell beam measurement reports, UE speed, history statistics, etc.) the number of RACH attempts to be performed to the serving cell ($N_s$) and to the non-serving cell ($N_{ns}$).

The non-serving cell(s), to which the UE will perform BFR, may be selected by the UE in case the UE context is available, may be explicitly indicated by the network (with the specific physical cell identity (PCI)), and/or may be selected by the UE considering other criteria, e.g., the MPE limitations. According to example embodiments, the UE may decide to change the cell to which it performs RACH attempts.

Figure 6:
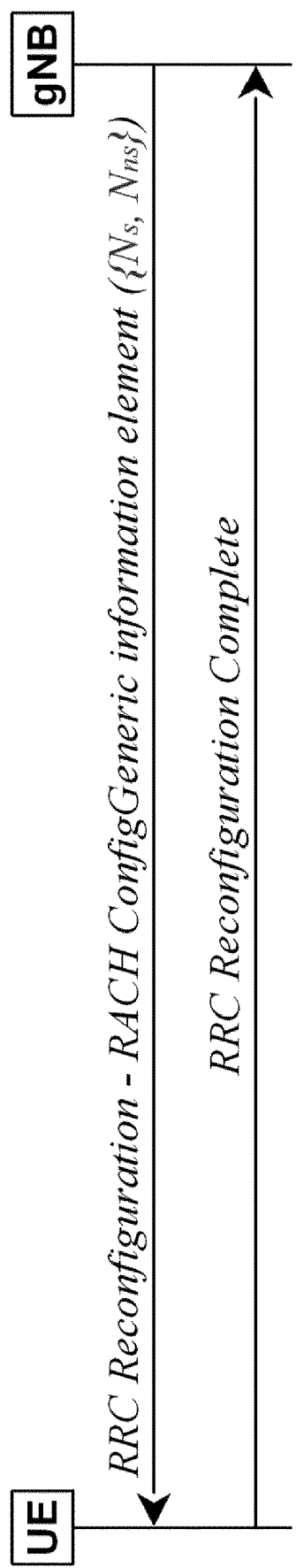
FIG. 6 shows a schematic diagram of signaling sequences according to example embodiments.

FIG. 6 shows a schematic diagram of signaling sequences according to example embodiments, and in particular illustrates a UE configuration to perform BFR to the serving cell and one non-serving cell using one BFR period for the serving cell and the non-serving cell.

That is, according to example embodiments, the configuration of the UE may be performed with the use of the RRC reconfiguration—RACH ConfigGeneric information element, as shown in FIG. 6.

In alternative implementations, the network may configure the maximum RACH attempts' period per cell (thus indirectly dictating the RACH attempts). In such implementation, the network would configure the UE to perform RACH attempts for a limited time $T_{RACH\_MAX}$, i.e. max duration of one BFR period. This could include the time for the RACH attempts to the serving cell and the non-serving cells. Alternatively, similar to the implementations described above the network may configure separate time limits for the serving cell ($T_{RACH\_MAX\_s}$) and the non-serving cells ($T_{RACH\_MAX\_ns}$).

Figure 7:
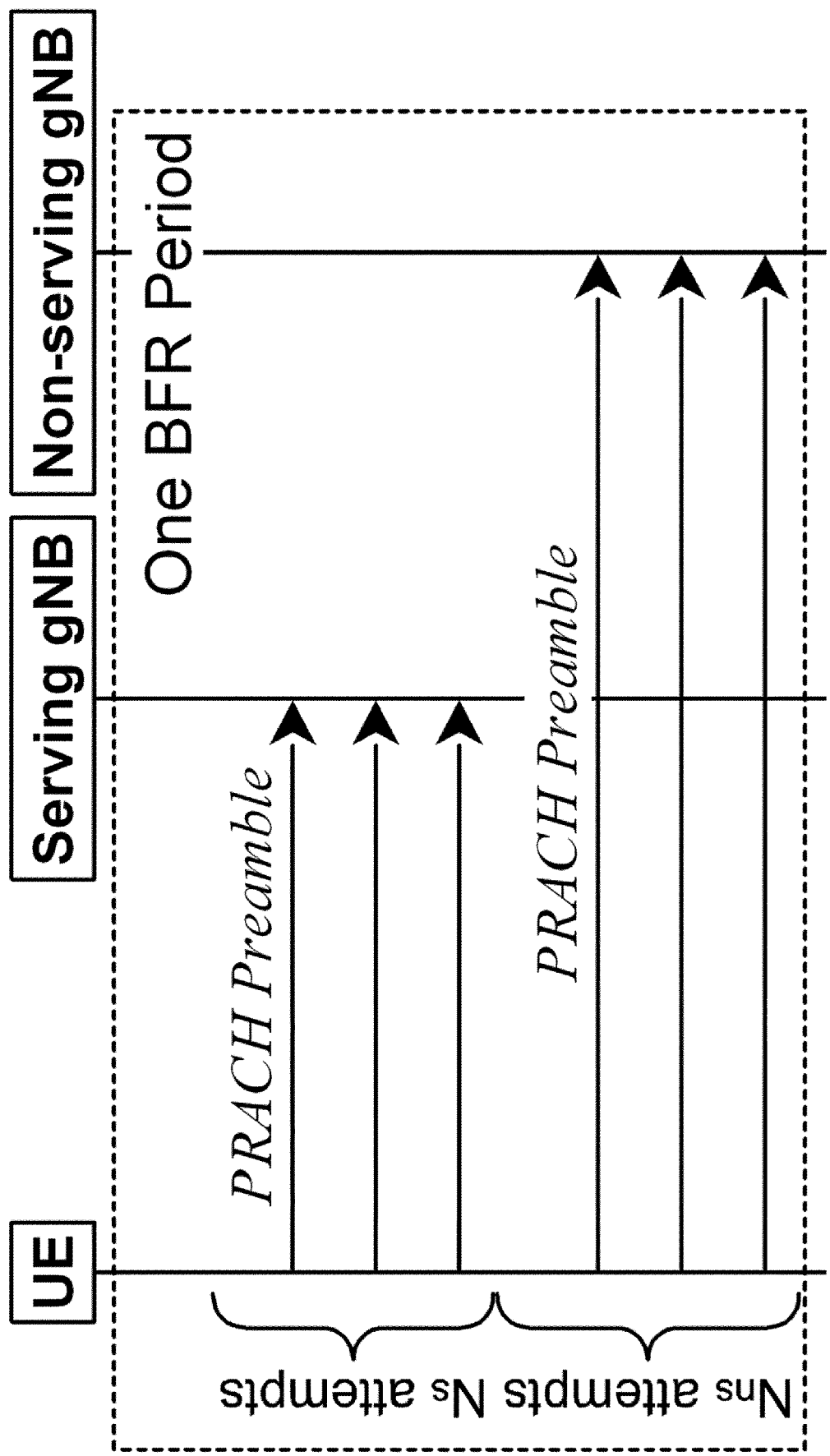
FIG. 7 shows a schematic diagram of signaling sequences according to example embodiments.

FIG. 7 shows a schematic diagram of signaling sequences according to example embodiments, and in particular illustrates performance of BFR to the serving cell and the non-serving cell using one BFR period.

Specifically, FIG. 7 shows the BFR process for the UE following the previously described configuration for the serving cell and the non-serving cell. According to the example embodiment illustrated in FIG. 7, the UE may perform the first $N_s$ for the serving cell and the $N_{ns}$ for the non-serving cell. In this implementation, the UE prioritizes the serving cell and once the attempts to the serving cell have failed, the UE starts the attempts to the non-serving cell. The RACH attempts may be CFRA or CBRA according to the UE configuration.

According to example embodiments, the RACH attempts to the non-serving cell could be for different cells and not necessarily to the same non-serving cell as exemplarily illustrated in FIG. 7.

According to example embodiments, the UE may perform the RACH attempts per cell sequentially or in parallel.

Figure 8:
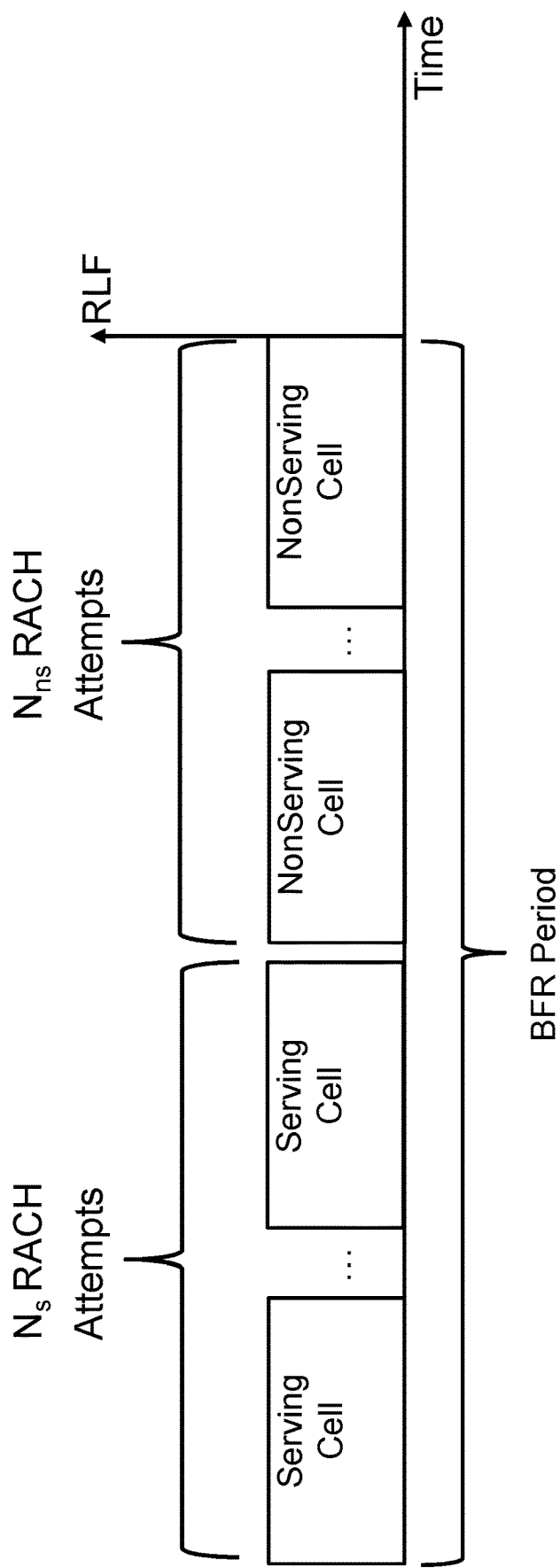
FIG. 8 is a schematic diagram showing an arrangement of random access channel attempts according to example embodiments.

FIG. 8 is a schematic diagram showing an arrangement of random access channel attempts according to example embodiments, and in particular illustrates sequential RACH attempts for example embodiments where one BFR period is used for the serving cell and non-serving cells.

In this case, the UE performs RACH attempts to the serving cell and the non-serving cell sequentially (the sequence can be based on different implementations). According to FIG. 8, the UE prioritizes the serving cell (since its context is available) and then proceeds to attempts in the non-serving cell (or cells depending on its configuration). However, example embodiments are not limited to such prioritization.

Figure 9:
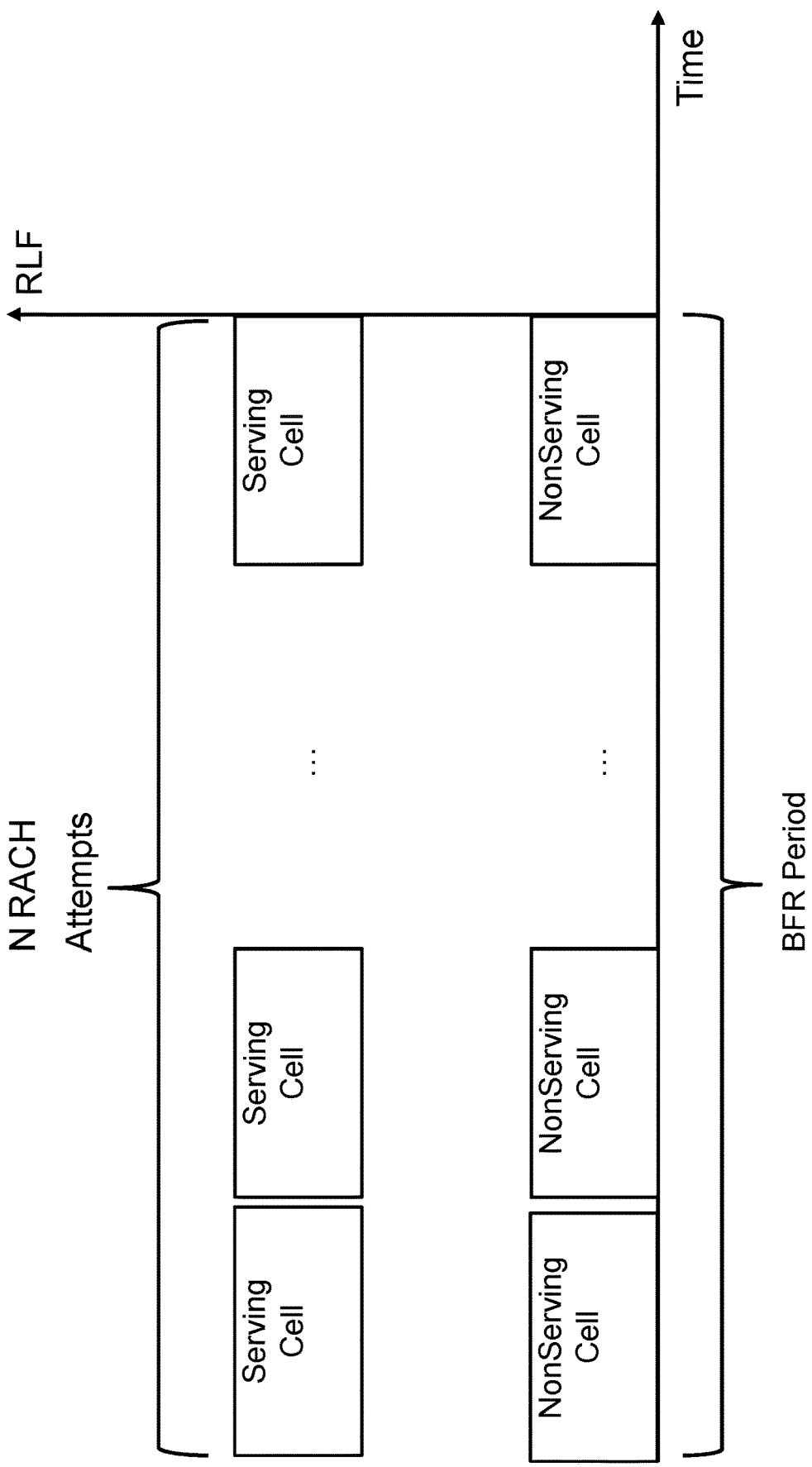
FIG. 9 is a schematic diagram showing an arrangement of random access channel attempts according to example embodiments.

FIG. 9 is a schematic diagram showing an arrangement of random access channel attempts according to example embodiments, and in particular illustrates parallel RACH attempts for example embodiments where one BFR period is used for the serving cell and non-serving cells.

In this case, the UE performs RACH to the serving cell and to the non-serving cell in parallel, from different panels. Note that the configurations for the number of RACH attempts is not necessarily the same for all cells, as is exemplarily shown in FIG. 9. The number of available panels may limit the attempts that can be performed in parallel.

According to example embodiments, once a RACH attempt is successful and the UE receives a RACH response (RAR) from a cell, the procedure will stop and the UE will recover in this cell (providing the RAR). This applies for both sequential and parallel RACH attempts.

In case of parallel RACH attempts, the UE may receive a RAR at the same time from the serving cell and from a non-serving cell. In this case, according to example embodiments, the UE may prioritize the serving cell, since its context is already available there.

According to example embodiments, each time the RACH attempt fails the UE ramps up the power based on the parameter powerRampingStep that is configured by a RRC reconfiguration message. For the sequential case, the UE may reset the power ramping if the first $N_s$ attempts to the serving cell fail, thus restarting the power ramping when performing random access (RA) to a non-serving cell.

According to example embodiments where one BFR period is used for the serving cell and non-serving cells, an explicit configuration of multiple cells may be provided.

Namely, according thereto, the network may configure the UE to perform RACH attempts to multiple cells. In such case, the network may configure the maximum number of RACH attempts (N) of the UE before the declaration of RLF, as well as the number of cells (n) to be used for BFR. Additionally or alternatively, the network may provide the number of RACH attempts $N_x$ to be used per cell (i.e., $N_1$ for cell_1, $N_2$ for cell_2, $N_n$ for cell_n). The previously mentioned cells include the serving cell as well. The network may specify the non-serving cells to which the UE shall perform RACH by providing the cell identifiers (PCI), or may leave it to the UE to decide (based on its implementation).

The maximum number of RACH attempts N is the sum of $N_x$ attempts per cell, i.e., $N=N_1+N_2+ \ldots +N_n$.

Figure 10:
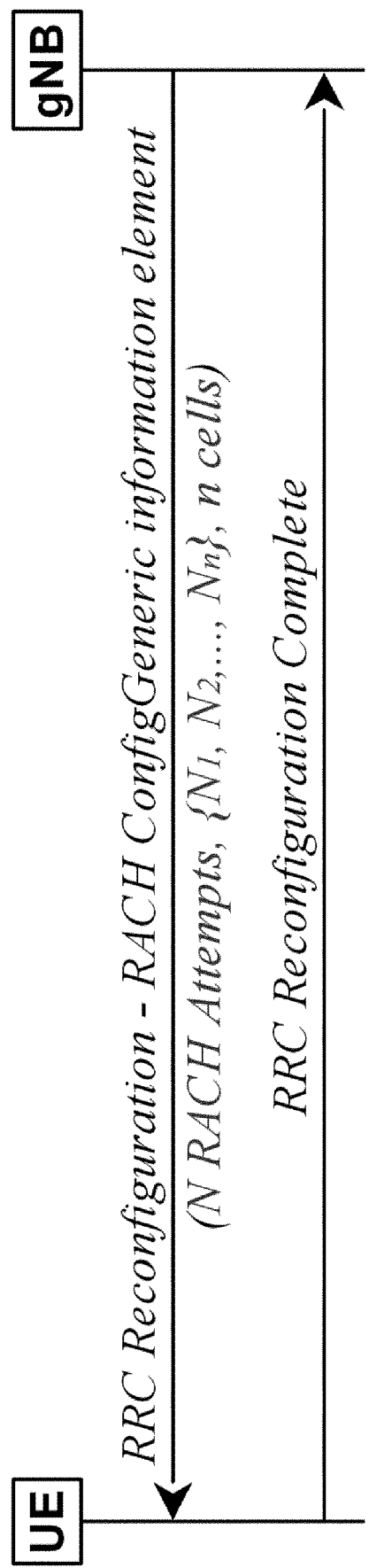
FIG. 10 shows a schematic diagram of signaling sequences according to example embodiments.

FIG. 10 shows a schematic diagram of signaling sequences according to example embodiments, and in particular illustrates an example UE configuration to perform BFR to the serving cell and non-serving cells using one BFR period for the serving cell and non-serving cells.

That is, according to example embodiments, the configuration of the UE may be performed with the use of the RRC reconfiguration—RACH ConfigGeneric information element.

Further, according other example embodiments, one BFR period for the serving cell is followed by another BFR period for each of the selected non-serving cells (more general, one BFR period for a BFR procedure to a cell is followed by another BFR period for a BFR procedure to another cell).

In detail, according to example embodiments, the UE may perform one BFR procedure to the serving cell and one for each of the selected non-serving cells. According to example embodiments, in this case, the UE will not declare RLF after each BFR failure but only when the last BFR fails.

Similarly to the approach discussed above, where one BFR period is be used for the serving cell and non-serving cells, if the network configures the UE with only two BFR periods, these will correspond to the serving and to the non-serving cell. The network may configure the number of RACH attempts to be performed to the serving cell ($N_s$) during the first BFR period and the RACH attempts to the non-serving cell ($N_{ns}$) when the first BFR period expires.

Figure 11:
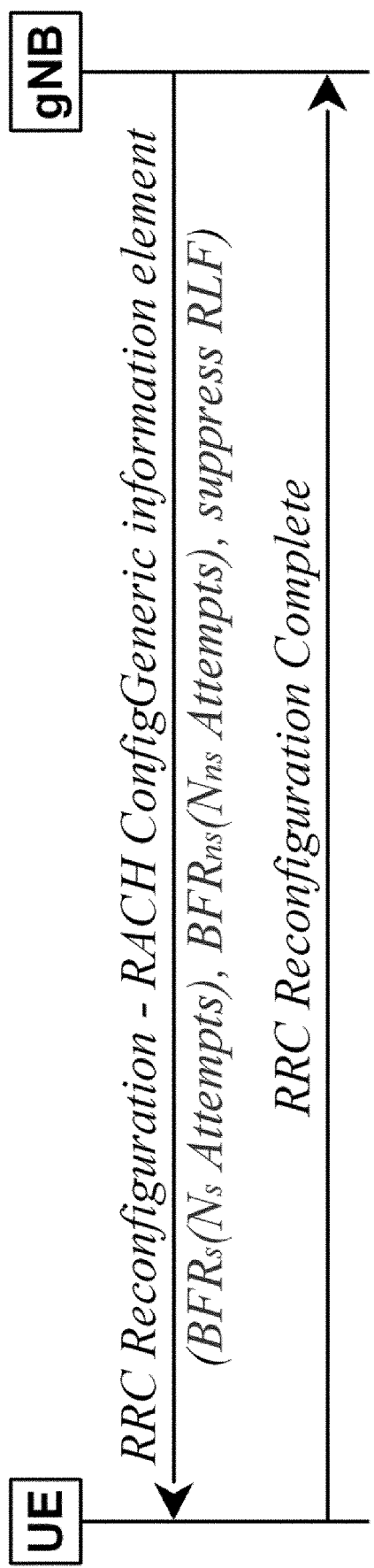
FIG. 11 shows a schematic diagram of signaling sequences according to example embodiments.

FIG. 11 shows a schematic diagram of signaling sequences according to example embodiments, and in particular illustrates an example UE configuration to perform BFR to the serving cell and non-serving cells using one BFR period for the serving cell and one BFR period for the selected non-serving cells.

As shown in FIG. 11, according to example embodiments, the network may configure the BFR period for the serving cell, by providing the number of RACH attempts to the serving cell ($N_s$) the BFR period for the non-serving cell, by providing the number of RACH attempts to the non-serving cell ($N_{ns}$), and/or the UE to suppress RLF after the first BFR period and declare RLF only after the last BFR period.

As illustrated in FIG. 11, the configuration of the UE may be performed with the use of the RRC Reconfiguration—RACH e.g. ConfigGeneric information element.

In alternative implementations, the network may configure the maximum RACH attempts period per BFR (thus indirectly dictating the RACH attempts). In such implementation the network would configure the UE to perform RACH attempts for a limited time $T_{RACH\_MAX}$ for each BFR. The $T_{RACH\_MAX}$ can be the same for all BFR periods or different. Alternatively, similar to the implementations described above the network may configure separate time limits for the serving cell ($T_{RACH\_MAX\_s}$) and the non-serving cells ($T_{RACH\_MAX\_ns}$).

According to example embodiments, the non-serving cell to which the UE will perform BFR may be selected by the UE in case the UE context is present, may be explicitly indicated by the network (with the specific PCI), and/or may be selected by the UE considering other criteria, e.g., the MPE limitations. The UE may decide to change the cell to which it performs RACH attempts.

Figure 12:
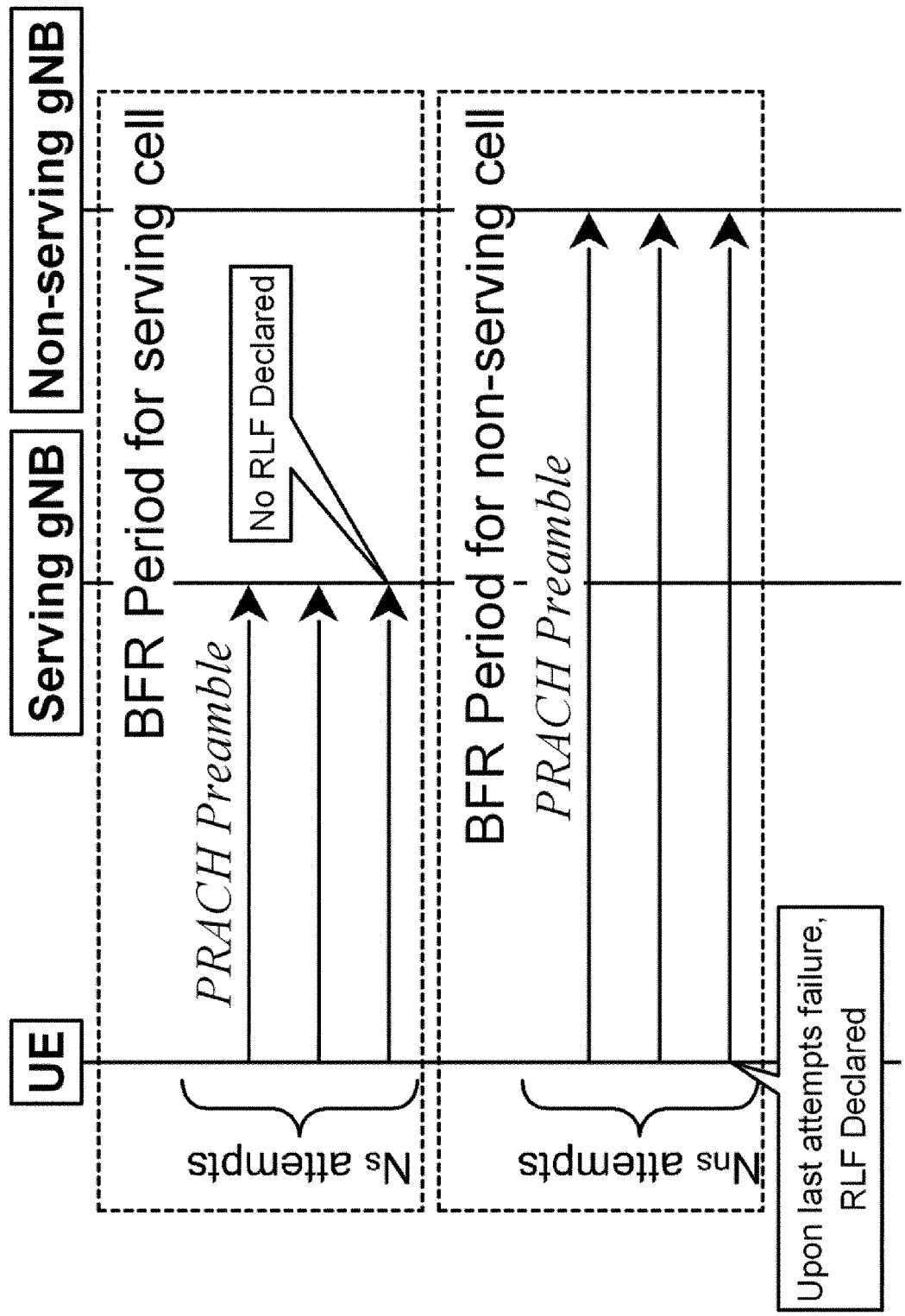
FIG. 12 shows a schematic diagram of signaling sequences according to example embodiments.

FIG. 12 shows a schematic diagram of signaling sequences according to example embodiments, and in particular illustrates performance of BFR to the serving cell and non-serving cell using multiple BFR periods.

Specifically, FIG. 12 shows the process where the UE is configured to perform two BFR procedures, one to the serving cell and one to a non-serving cell. As exemplarily shown in FIG. 12, the UE performs the first BFR for the serving cell (using $N_s$ RACH attempts) and the second BFR for the non-serving cell (using $N_{ns}$ RACH attempts). In this implementation, the UE prioritizes the serving cell and once the attempts to the serving cell have failed, the UE starts the attempts to the non-serving cell. However, example embodiments are not limited to such prioritization. The RACH attempts may be CFRA or CBRA according to the UE configuration.

According to example embodiments, the RACH attempts to the non-serving cell could be for different cells and not necessarily the same non-serving cell, as exemplarily shown in FIG. 12.

Similarly to the approach discussed above, where one BFR period is be used for the serving cell and non-serving cells, the UE may perform the attempts per cell sequentially or in parallel.

Figure 13:
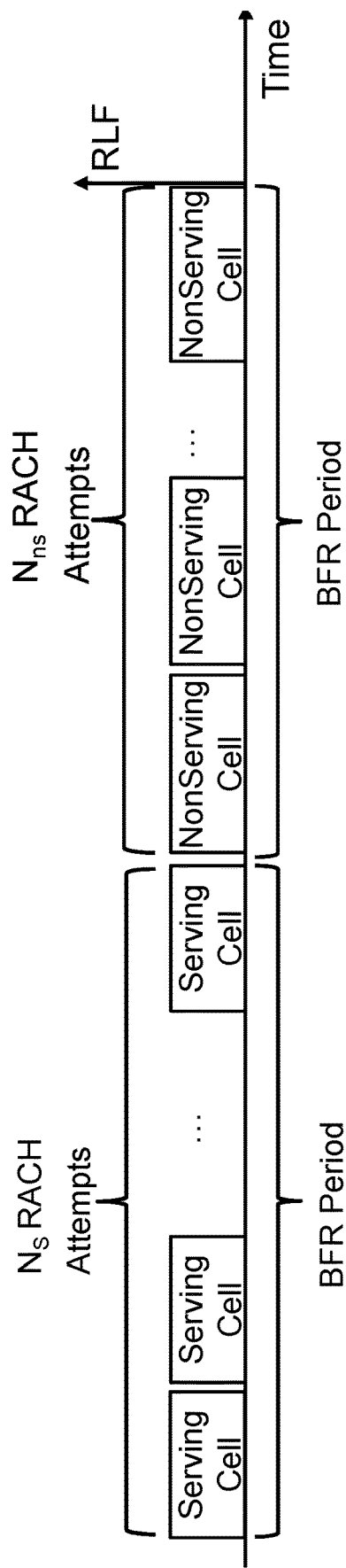
FIG. 13 is a schematic diagram showing an arrangement of random access channel attempts according to example embodiments.

FIG. 13 is a schematic diagram showing an arrangement of random access channel attempts according to example embodiments, and in particular illustrates sequential RACH attempts for example embodiments where one BFR period for the serving cell is followed by another BFR period for each of the selected non-serving cells (more general, one BFR period for a BFR procedure to a cell is followed by another BFR period for a BFR procedure to another cell).

In this case, the UE performs RACH to the serving cell and the non-serving cells sequentially. According to FIG. 13, the UE prioritizes the serving cell (since its context is available) and then proceeds to attempts in the non-serving cell (or cells depending on its configuration). However, example embodiments are not limited to such prioritization.

Figure 14:
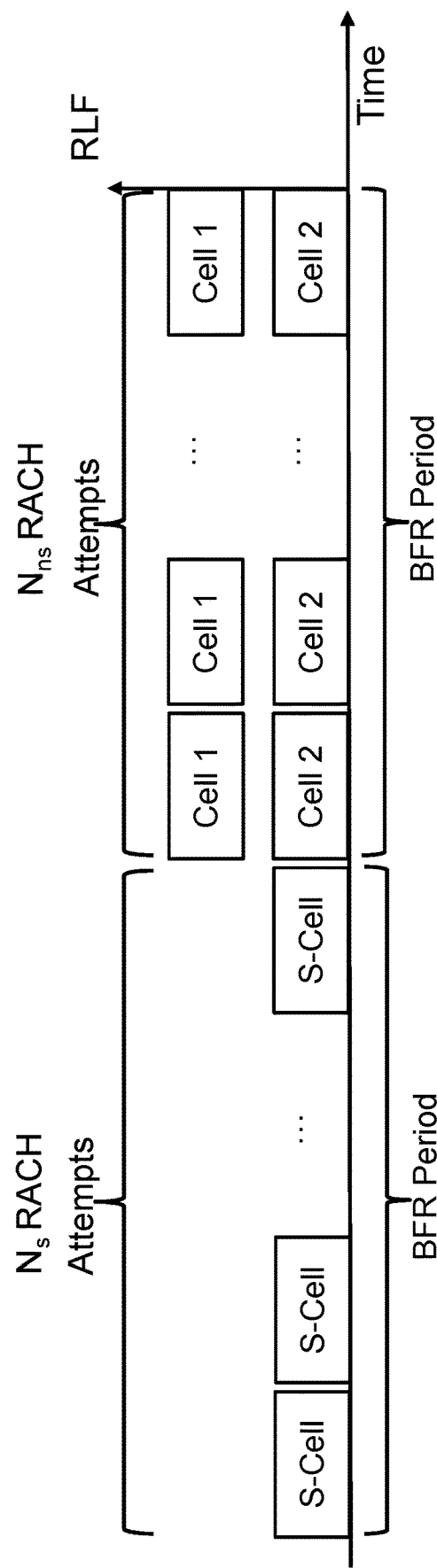
FIG. 14 is a schematic diagram showing an arrangement of random access channel attempts according to example embodiments.

FIG. 14 is a schematic diagram showing an arrangement of random access channel attempts according to example embodiments, and in particular illustrates parallel RACH attempts for example embodiments where one BFR period for the serving cell is followed by another BFR period for each of the selected non-serving cells (more general, one BFR period for a BFR procedure to a cell is followed by another BFR period for a BFR procedure to another cell).

In this case, the UE performs RACH to the serving cell and then in parallel to non-serving cells (i.e., more than one cells); this implies that the serving cell is prioritized against the non-serving ones. However, example embodiments are not limited to such prioritization. In this case, the UE may attempt to recover to multiple non-serving cells.

In example embodiments illustrated in FIG. 13 and FIG. 14, the non-serving cell to which the UE attempts RACH access could be the same during the whole BFR period, or may be different e.g. in each RACH attempt.

As mentioned above, while example embodiments illustrated in FIG. 13 and FIG. 14 present solutions where the UE prioritizes the serving cell against the non-serving cell(s), example embodiments are not limited to such prioritization.

In case the network or the UE does not intend to prioritize one cell instead of another, the UE may perform BFR procedures in parallel to both serving and non-serving cells, similarly to the approach discussed above, where one BFR period is be used for the serving cell and non-serving cells.

According to example embodiments where one BFR period for the serving cell is followed by another BFR period for each of the selected non-serving cells (more general, one BFR period for a BFR procedure to a cell is followed by another BFR period for a BFR procedure to another cell), an explicit configuration of multiple cells may be provided.

Namely, according thereto, similarly to the approach discussed above, where one BFR period is be used for the serving cell and non-serving cells, the network may explicitly configure the UE to perform RACH attempts to multiple cells. In such case the network may configure the number of cells to be used for BFR. Additionally, or alternatively, the network may configure the number of attempts $N_x$ per cell (i.e., $N_1$ for cell_1, $N_2$ for cell_2, $N_n$ for cell_n), where the previously mentioned cells include the serving cell as well, and where, in case only two cells are defined, these denote the serving and one non-serving cell. Additionally, or alternatively, the network may configure the UE suppress RLF declaration in all the BFR attempts except the last one.

Figure 15:
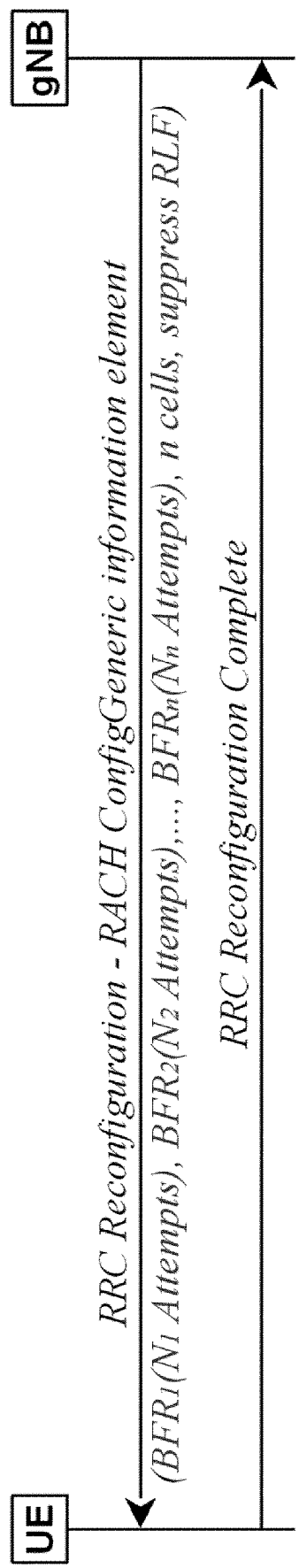
FIG. 15 shows a schematic diagram of signaling sequences according to example embodiments.

FIG. 15 shows a schematic diagram of signaling sequences according to example embodiments, and in particular illustrates an example UE configuration to perform BFR to the serving cell and non-serving cells using one BFR period for the serving cell and one BFR period for each of the selected non-serving cells.

That is, according to example embodiments, the network may specify the non-serving cells to which the UE shall perform RACH by providing the cell identifiers (PCI) or may leave it to the UE to decide (based on its implementation). The configuration of the UE may be performed with the use of the RRC reconfiguration—RACH ConfigGeneric information element.

Further, according example embodiments where one BFR period is be used for the serving cell and non-serving cells, and according example embodiments where one BFR period for a BFR procedure to a cell is followed by another BFR period for a BFR procedure to another cell, a cell prioritization algorithm may be provided.

As we mentioned above in relation to the example embodiments where one BFR period is be used for the serving cell and non-serving cells and the example embodiments where one BFR period for a BFR procedure to a cell is followed by another BFR period for a BFR procedure to another cell, the UE may prioritize the serving cell instead of the non-serving cell in order to exploit the context presence in the serving cell. However, alternatively, the decision whether to prioritize the serving cell or not may be based e.g. on the availability of and the ability (reception level above the usage threshold) to use CFRA resources.

Figure 16:
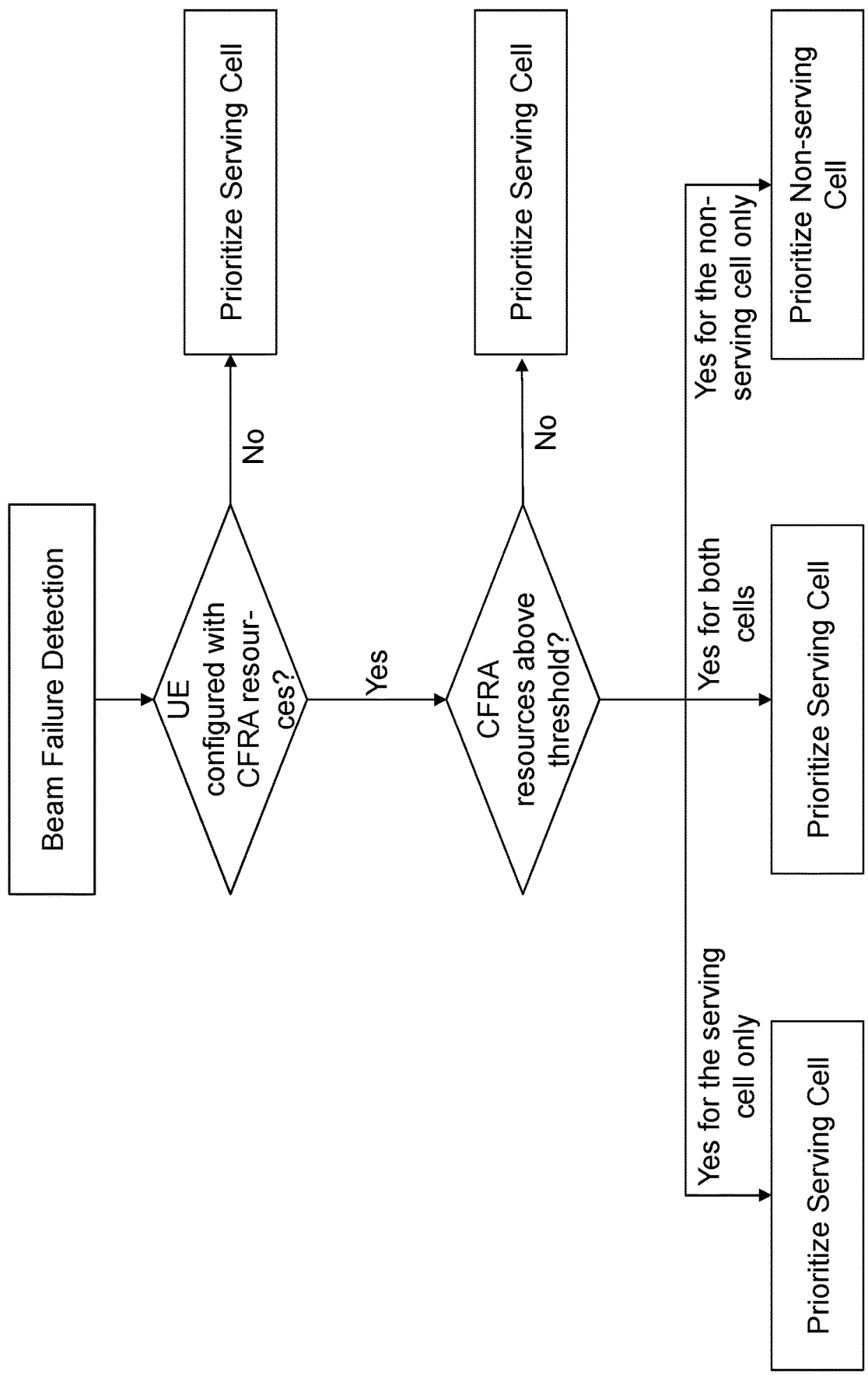
FIG. 16 is a schematic diagram of a procedure according to example embodiments.

FIG. 16 is a schematic diagram of a procedure according to example embodiments, and in particular illustrates an example algorithm for prioritization of cells to perform BFR.

The algorithm presented in FIG. 16 presents a potential implementation on how the UE may decide on which cell it should prioritize to perform the BFR considering the configuration of CFRA resources in serving and non-serving cells. The prioritization may be applied for both the example embodiments where one BFR period is be used for the serving cell and non-serving cells and the example embodiments where one BFR period for a BFR procedure to a cell is followed by another BFR period for a BFR procedure to another cell for the sequential case and for the example embodiments where one BFR period for a BFR procedure to a cell is followed by another BFR period for a BFR procedure to another cell for parallel case (as shown e.g. in FIG. 14).

According to example embodiments, in the sequential case, the UE will prioritize the cell according to the algorithm to initiate the $N_s$ attempts and it will continue with the other cells as indicated in the algorithm.

In the case of the parallel attempts, according to example embodiments, the approach to be followed may be the one presented in FIG. 14.

In other alternative implementations, the UE may decide to recover to the serving cell using CBRA resources even if it can use CFRA resources in the non-serving cell.

In other implementations, the coverage of a panel may be used in order to force the UE to prioritize one cell instead of another. For example, if the panel used to communicate with the serving cell is covered (and thus have limited transmission (Tx) power due to MPE), the UE may decide to recover in another cell (e.g., non-serving cell in FIG. 17).

Figure 17:
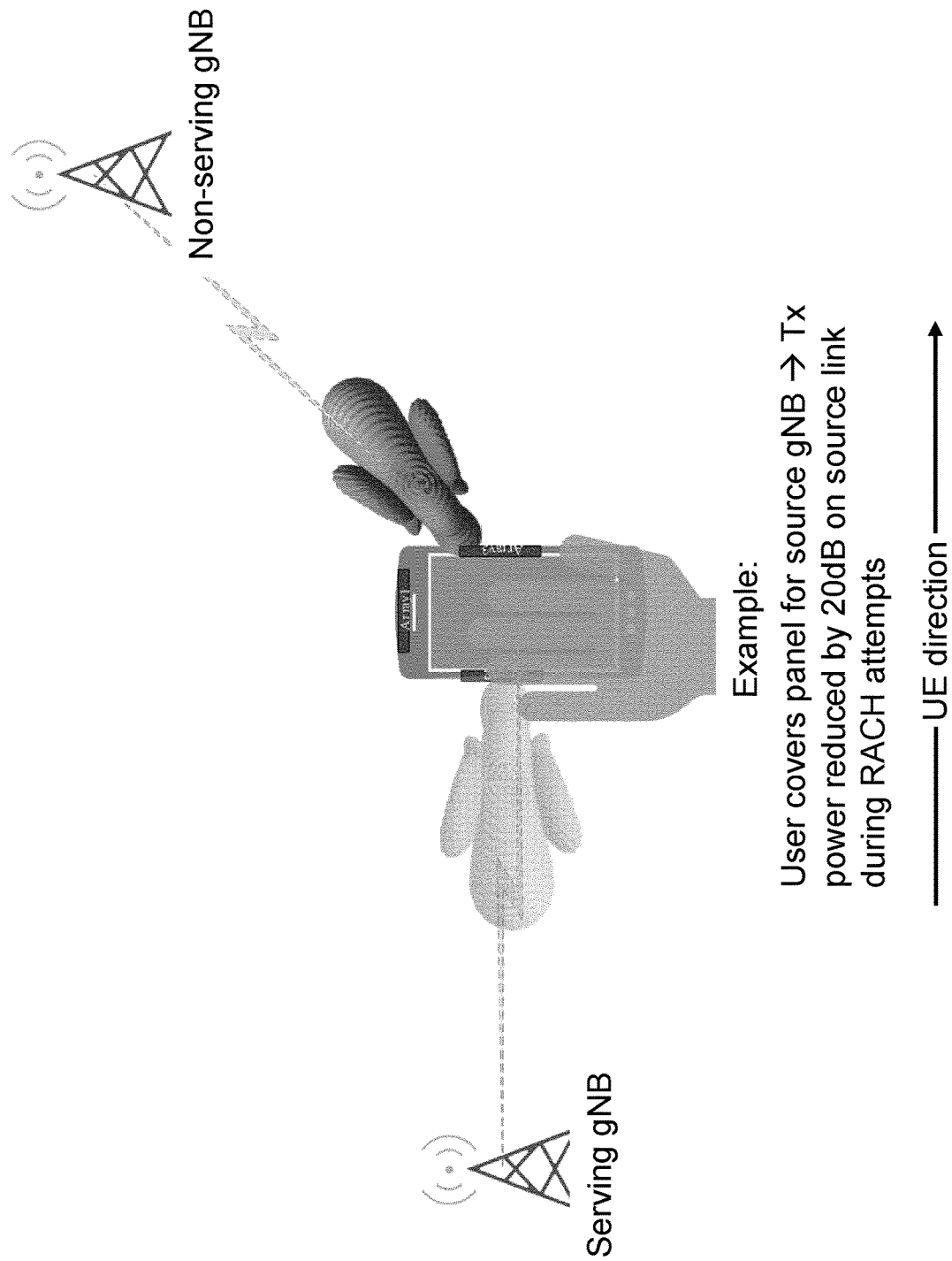
FIG. 17 is a schematic diagram of an example of a system environment illustrating influence of panel blockage in the light of maximum permissible exposure on success of a beam failure recovery procedure.

FIG. 17 is a schematic diagram of an example of a system environment illustrating influence of panel blockage in the light of maximum permissible exposure on success of a beam failure recovery procedure, and in particular illustrates exemplarily panel blockage by the UE user and prioritization of the non-serving cell.

In case of sequential attempts, the UE may decide to switch the prioritized cell if the MPE condition is detected, before reaching the preconfigured number of Maximum RACH attempts. According to example embodiments, the UE is not required to select or evaluate beam failure recovery candidates on cells that are affected by MPE. According to further example embodiments, in a sequential BFR, if the UE determines that the current cell (serving or non-serving) that the UE tries to recover to is affected by MPE, it may ignore the remaining RACH attempts (i.e. it could consider that maximum number of attempts has been reached) on that cell and select the next one on the list.

According to further example embodiments, the network may configure the UE with a priority rule. Such priority rule may include, for example
  Prioritize the serving cell,
  Prioritize based on CFRA resources,
  Prioritize based on the MPE condition, and/or
  Different level of priorities.

According to example embodiments, the network may decide which priority rule to be applied for the UE based on e.g. inter-cell measurement reports, intra-cell beam measurement reports (e.g., L1 reference signal received power (L1-RSRP)), UE speed, UE location, beam switching history, or other criteria. Once the UE receives the priority rule as a part of the RRC reconfiguration message, it follows the dedicated priority rule set by the network. According to example embodiments, the network may be able to dynamically change this priority rule through a RRC reconfiguration message.

According to the example embodiments illustrated above, the network configures the UE to perform BFR to multiple cells, including the serving one.

Thus, according to some or all of the example embodiments illustrated above, advantageously, the serving cell may be prioritized because it is less processing and signaling costly (since the UE context is there and it is simpler to perform CFRA).

Further, according to some or all of the example embodiments illustrated above, advantageously, non-serving cells are not excluded in case they are suitable to serve the UE.

Further, according to some or all of the example embodiments illustrated above, advantageously, the impact of MPE on UE panel that is used for sending physical random access channel (PRACH) is reduced by enabling parallel/sequential RACH attempts in BFR to serving and non-serving cells.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 18:
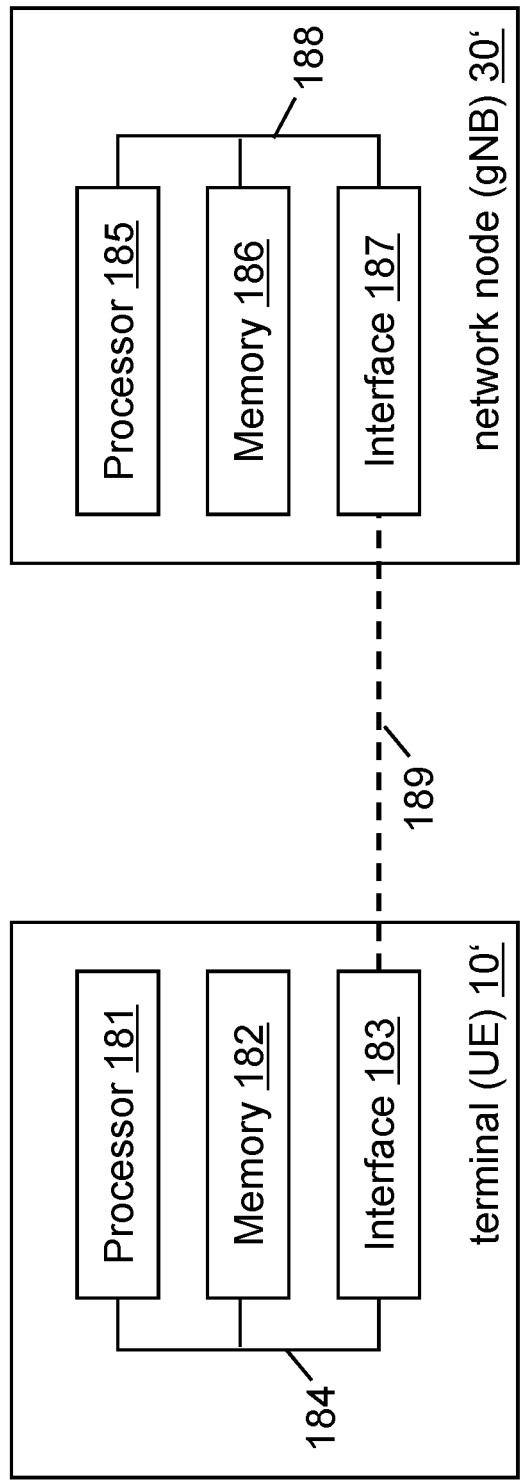
FIG. 18 is a block diagram alternatively illustrating apparatuses according to example embodiments.

In FIG. 18, an alternative illustration of apparatuses according to example embodiments is depicted. As indicated in FIG. 18, according to example embodiments, the apparatus (terminal) 10' (corresponding to the terminal 10) comprises a processor 181, a memory 182 and an interface 183, which are connected by a bus 184 or the like. Further, according to example embodiments, the apparatus (network node) 30' (corresponding to the network node 30) comprises a processor 185, a memory 186 and an interface 187, which are connected by a bus 188 or the like, and the apparatuses may be connected via link 189, respectively.

The processor 181/185 and/or the interface 183/187 may also include a modem or the like to facilitate communication over a (hardwire or wireless) link, respectively. The interface 183/187 may include a suitable transceiver coupled to one or more antennas or communication means for (hardwire or wireless) communications with the linked or connected device(s), respectively. The interface 183/187 is generally configured to communicate with at least one other apparatus, i.e. the interface thereof.

The memory 182/186 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the terminal comprises at least one processor 181, at least one memory 182 including computer program code, and at least one interface 183 configured for communication with at least another apparatus. The processor (i.e. the at least one processor 181, with the at least one memory 182 and the computer program code) is configured to perform identifying a beam failure with respect to a radio beam provided by a serving cell of said terminal (thus the apparatus comprising corresponding means for identifying), and to perform deciding, in response to an identified beam failure, to perform beam failure recovery attempts including at least a first beam failure recovery attempt and a second beam failure recovery attempt with respect to said serving cell of said terminal and at least one non-serving cell of said terminal (thus the apparatus comprising corresponding means for deciding).

According to further example embodiments, an apparatus representing the network node 30 (controlling network access for a terminal) comprises at least one processor 185, at least one memory 186 including computer program code, and at least one interface 187 configured for communication with at least another apparatus. The processor (i.e. the at least one processor 185, with the at least one memory 186 and the computer program code) is configured to perform deciding on a beam failure handling decision configuration for said terminal (thus the apparatus comprising corresponding means for deciding), and to perform controlling transmission of said beam failure handling decision configuration to said terminal (thus the apparatus comprising corresponding means for controlling), wherein said beam failure handling decision configuration configures a deciding behavior of said terminal regarding performance of beam failure recovery attempts with respect to a serving cell of said terminal and at least one non-serving cell of said terminal.

For further details regarding the operability/functionality of the individual apparatuses, reference is made to the above description in connection with any one of FIGS. 1 to 17, respectively.

In particular, the following apparatus related aspects represent example embodiments:

Aspect 1. An apparatus of a terminal, comprising
identifying circuitry configured to identify a beam failure with respect to a radio beam provided by a serving cell of said terminal, and
deciding circuitry configured to decide, in response to an identified beam failure, to perform beam failure recovery attempts including at least a first beam failure recovery attempt and a second beam failure recovery attempt with respect to said serving cell of said terminal and at least one non-serving cell of said terminal.

Aspect 2. The apparatus according to aspect 1, further comprising
performing circuitry configured to perform, based on a result of said deciding circuitry, said first beam failure recovery attempt with respect to said serving cell of said terminal within a first beam failure recovery period.

Aspect 3. The apparatus according to aspect 2, further comprising
performing circuitry configured to perform, based on a result of said deciding circuitry, said second beam failure recovery attempt with respect to a first non-serving cell of said at least one non-serving cell of said terminal within a second beam failure recovery period.

Aspect 4. The apparatus according to aspect 1, further comprising
performing circuitry configured to perform, based on said deciding, said first beam failure recovery attempt with respect to a first non-serving cell of said at least one non-serving cell of said terminal within a first beam failure recovery period.

Aspect 5. The apparatus according to aspect 4, further comprising
performing circuitry configured to perform, based on said deciding, said second beam failure recovery attempt with respect to said serving cell of said terminal within a second beam failure recovery period.

Aspect 6. The apparatus according to aspect 3 or 5, wherein
said first beam failure recovery period is identical with said second beam failure recovery period.

Aspect 7. The apparatus according to aspect 6, wherein
said second beam failure recovery attempt is performed in parallel with said first beam failure recovery attempt.

Aspect 8. The apparatus according to aspect 6, wherein
said second beam failure recovery attempt is performed subsequent to said first beam failure recovery attempt.

Aspect 9. The apparatus according to any of aspects 6 to 8, further comprising
receiving circuitry configured to receive a beam failure handling decision configuration, wherein said deciding is based on said beam failure handling decision configuration.

Aspect 10. The apparatus according to aspect 9, wherein
said beam failure handling decision configuration comprises a serving cell attempts number of random access channel attempts to be used for beam failure recovery endeavor with respect to said serving cell of said terminal.

Aspect 11. The apparatus according to aspect 9 or 10, wherein
said beam failure handling decision configuration comprises a non-serving cell attempts number of random access channel attempts to be used for beam failure recovery endeavor with respect to said at least one non-serving cell of said terminal.

Aspect 12. The apparatus according to aspect 11, wherein
said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 13. The apparatus according to aspect 12, wherein
said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 14. The apparatus according to any of aspects 9 to 13, wherein
said beam failure handling decision configuration is a random access channel ConfigGeneric information element.

Aspect 15. The apparatus according to aspect 13 or 15, wherein
said second beam failure recovery period follows said first beam failure recovery period.

Aspect 16. The apparatus according to aspect 15, further comprising
performing circuitry configured to perform, based on a result of said deciding circuitry, a third beam failure recovery attempt with respect to a second non-serving cell of said at least one non-serving cell of said terminal within a third beam failure recovery period.

Aspect 17. The apparatus according to aspect 16, wherein
said first beam failure recovery period is identical with said third beam failure recovery period.

Aspect 18. The apparatus according to aspect 17, wherein
said third beam failure recovery attempt is performed in parallel with said first beam failure recovery attempt.

Aspect 19. The apparatus according to aspect 16, wherein
said second beam failure recovery period is identical with said third beam failure recovery period.

Aspect 20. The apparatus according to aspect 19, wherein
said third beam failure recovery attempt is performed in parallel with said second beam failure recovery attempt.

Aspect 21. The apparatus according to aspect 16, wherein
said third beam failure recovery period follows said second beam failure recovery period.

Aspect 22. The apparatus according to any of aspects 15 to 21, further comprising
receiving circuitry configured to receive a beam failure handling decision configuration, wherein said deciding is based on said beam failure handling decision configuration.

Aspect 23. The apparatus according to aspect 22, wherein
said beam failure handling decision configuration comprises a serving cell attempts number of random access channel attempts to be used for beam failure recovery endeavor with respect to said serving cell of said terminal.

Aspect 24. The apparatus according to aspect 22 or 23, wherein
said beam failure handling decision configuration comprises a non-serving cell attempts number of random access channel attempts to be used for beam failure recovery endeavor with respect to said at least one non-serving cell of said terminal.

Aspect 25. The apparatus according to aspect 24, wherein
said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 26. The apparatus according to aspect 25, wherein
said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 27. The apparatus according to any of aspects 22 to 26, wherein
said beam failure handling decision configuration comprises an indication to suppress declaration of radio link failure and initiation of connection re-establishment until a last decided beam failure recovery attempt fails.

Aspect 28. The apparatus according to any of aspects 22 to 27, wherein
said beam failure handling decision configuration is a random access channel ConfigGeneric information element.

Aspect 29. The apparatus according to any of aspects 1 to 28, further comprising
determining circuitry configured to determine a priority order between said first beam failure recovery attempt and said second beam failure recovery attempt based on at least one of availability of contention free random access based attempts with respect to respective cells, transmission power limitation towards said respective cells, and predetermined priority rules with respect to said respective cells.

Aspect 30. The apparatus according to aspect 29, further comprising
prioritizing circuitry configured to prioritize, if said terminal is not configured with contention free random access resources, said serving cell, and/or
prioritizing circuitry configured to prioritize, if said terminal is configured with contention free random access resources, and said configured contention free random access resources do not exceed a predetermined threshold, said serving cell, and/or
prioritizing circuitry configured to prioritize, if said terminal is configured with contention free random access resources, and said configured contention free random access resources exceed said predetermined threshold for said serving cell, and said configured contention free random access resources do not exceed said predetermined threshold for a selected non-serving cell, said serving cell, and/or
prioritizing circuitry configured to prioritize, if said terminal is configured with contention free random access resources, and said configured contention free random access resources exceed said predetermined threshold for the serving cell and for said selected non-serving cell, said serving cell, and/or
prioritizing circuitry configured to prioritize, if said terminal is configured with contention free random access resources, and said configured contention free random access resources do not exceed said predetermined threshold for said serving cell, and said configured contention free random access resources exceed said predetermined threshold for said selected non-serving cell, said selected non-serving cell.

Aspect 31. The apparatus according to any of aspects 1 to 30, further comprising
receiving circuitry configured to receive a random access channel response in relation to beam failure recovery endeavor with respect to said serving cell of said terminal and/or in relation to beam failure recovery endeavor with respect to said at least one non-serving cell of said terminal, and
stopping circuitry configured to stop performance of beam failure recovery attempts with respect to said serving cell of said terminal and said at least one non-serving cell of said terminal.

Aspect 32. The apparatus according to any of aspects 1 to 31, further comprising
suppressing circuitry configured to suppress declaration of radio link failure and initiation of connection re-establishment until a last decided beam failure recovery attempt fails.

Aspect 33. The apparatus according to any of aspects 1 to 32, further comprising
counting circuitry configured to count beam failure instance indications, and
comparing circuitry configured to compare said counted beam failure instance indications with a predetermined beam failure instance indications threshold.

Aspect 34. An apparatus of a network entity controlling network access for a terminal, comprising
deciding circuitry configured to decide on a beam failure handling decision configuration for said terminal, and
controlling circuitry configured to control transmission of said beam failure handling decision configuration to said terminal, wherein
said beam failure handling decision configuration configures a deciding behavior of said terminal regarding performance of beam failure recovery attempts with respect to a serving cell of said terminal and at least one non-serving cell of said terminal.

Aspect 35. The apparatus according to aspect 34, wherein
said beam failure handling decision configuration comprises a serving cell attempts number of random access channel attempts to be used for beam failure recovery endeavor with respect to said serving cell of said terminal.

Aspect 36. The apparatus according to aspect 34 or 35, wherein
said beam failure handling decision configuration comprises a non-serving cell attempts number of random access channel attempts to be used for beam failure recovery endeavor with respect to said at least one non-serving cell of said terminal.

Aspect 37. The apparatus according to aspect 36, wherein
said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 38. The apparatus according to aspect 37, wherein
said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 39. The apparatus according to any of aspects 34 to 38, wherein
said beam failure handling decision configuration comprises an indication to suppress declaration of radio link failure and initiation of connection re-establishment until a last decided beam failure recovery attempt fails.

Aspect 40. The apparatus according to any of aspects 34 to 39, wherein
said beam failure handling decision configuration is a random access channel ConfigGeneric information element.

Aspect 41. An apparatus of a terminal, comprising
at least one processor,
at least one memory including computer program code, and
at least one interface configured for communication with at least another apparatus,
the at least one processor, with the at least one memory and the computer program code, being configured to cause the apparatus to perform:
identifying a beam failure with respect to a radio beam provided by a serving cell of said terminal, and
deciding, in response to an identified beam failure, to perform beam failure recovery attempts including at least a first beam failure recovery attempt and a second beam failure recovery attempt with respect to said serving cell of said terminal and at least one non-serving cell of said terminal.

Aspect 42. The apparatus according to aspect 41, wherein
the at least one processor, with the at least one memory and the computer program code, being configured to cause the apparatus to perform:
performing, based on said deciding, said first beam failure recovery attempt with respect to said serving cell of said terminal within a first beam failure recovery period.

Aspect 43. The apparatus according to aspect 42, wherein
the at least one processor, with the at least one memory and the computer program code, being configured to cause the apparatus to perform:
performing, based on said deciding, said second beam failure recovery attempt with respect to a first non-serving cell of said at least one non-serving cell of said terminal within a second beam failure recovery period.

Aspect 44. The apparatus according to aspect 41, wherein
the at least one processor, with the at least one memory and the computer program code, being configured to cause the apparatus to perform:
performing, based on said deciding, said first beam failure recovery attempt with respect to a first non-serving cell of said at least one non-serving cell of said terminal within a first beam failure recovery period.

Aspect 45. The apparatus according to aspect 44, wherein
the at least one processor, with the at least one memory and the computer program code, being configured to cause the apparatus to perform:
performing, based on said deciding, said second beam failure recovery attempt with respect to said serving cell of said terminal within a second beam failure recovery period.

Aspect 46. The apparatus according to aspect 43 or 45, wherein
said first beam failure recovery period is identical with said second beam failure recovery period.

Aspect 47. The apparatus according to aspect 46, wherein
said second beam failure recovery attempt is performed in parallel with said first beam failure recovery attempt.

Aspect 48. The apparatus according to aspect 46, wherein
said second beam failure recovery attempt is performed subsequent to said first beam failure recovery attempt.

Aspect 49. The apparatus according to any of aspects 46 to 48, wherein
the at least one processor, with the at least one memory and the computer program code, being configured to cause the apparatus to perform:
receiving a beam failure handling decision configuration, wherein said deciding is based on said beam failure handling decision configuration.

Aspect 50. The apparatus according to aspect 49, wherein
said beam failure handling decision configuration comprises a serving cell attempts number of random access channel attempts to be used for beam failure recovery endeavor with respect to said serving cell of said terminal.

Aspect 51. The apparatus according to aspect 49 or 50, wherein
said beam failure handling decision configuration comprises a non-serving cell attempts number of random access channel attempts to be used for beam failure recovery endeavor with respect to said at least one non-serving cell of said terminal.

Aspect 52. The apparatus according to aspect 51, wherein
said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 53. The apparatus according to aspect 52, wherein said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 54. The apparatus according to any of aspects 49 to 53, wherein
said beam failure handling decision configuration is a random access channel ConfigGeneric information element.

Aspect 55. The apparatus according to aspect 43 or 45, wherein
said second beam failure recovery period follows said first beam failure recovery period.

Aspect 56. The apparatus according to aspect 55, wherein the at least one processor, with the at least one memory and the computer program code, being configured to cause the apparatus to perform:
performing, based on said deciding, a third beam failure recovery attempt with respect to a second non-serving cell of said at least one non-serving cell of said terminal within a third beam failure recovery period.

Aspect 57. The apparatus according to aspect 56, wherein said first beam failure recovery period is identical with said third beam failure recovery period.

Aspect 58. The apparatus according to aspect 57, wherein said third beam failure recovery attempt is performed in parallel with said first beam failure recovery attempt.

Aspect 59. The apparatus according to aspect 56, wherein said second beam failure recovery period is identical with said third beam failure recovery period.

Aspect 60. The apparatus according to aspect 59, wherein said third beam failure recovery attempt is performed in parallel with said second beam failure recovery attempt.

Aspect 61. The apparatus according to aspect 56, wherein said third beam failure recovery period follows said second beam failure recovery period.

Aspect 62. The apparatus according to any of aspects 55 to 61, wherein
the at least one processor, with the at least one memory and the computer program code, being configured to cause the apparatus to perform:
receiving a beam failure handling decision configuration, wherein said deciding is based on said beam failure handling decision configuration.

Aspect 63. The apparatus according to aspect 62, wherein said beam failure handling decision configuration comprises a serving cell attempts number of random access channel attempts to be used for beam failure recovery endeavor with respect to said serving cell of said terminal.

Aspect 64. The apparatus according to aspect 62 or 63, wherein
said beam failure handling decision configuration comprises a non-serving cell attempts number of random access channel attempts to be used for beam failure recovery endeavor with respect to said at least one non-serving cell of said terminal.

Aspect 65. The apparatus according to aspect 64, wherein said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 66. The apparatus according to aspect 65, wherein said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 67. The apparatus according to any of aspects 62 to 66, wherein
said beam failure handling decision configuration comprises an indication to suppress declaration of radio link failure and initiation of connection re-establishment until a last decided beam failure recovery attempt fails.

Aspect 68. The apparatus according to any of aspects 62 to 67, wherein
said beam failure handling decision configuration is a random access channel ConfigGeneric information element.

Aspect 69. The apparatus according to any of aspects 41 to 68, wherein
the at least one processor, with the at least one memory and the computer program code, being configured to cause the apparatus to perform:
determining a priority order between said first beam failure recovery attempt and said second beam failure recovery attempt based on at least one of availability of contention free random access based attempts with respect to respective cells, transmission power limitation towards said respective cells, and predetermined priority rules with respect to said respective cells.

Aspect 70. The apparatus according to aspect 69, wherein the at least one processor, with the at least one memory and the computer program code, being configured to cause the apparatus to perform:
prioritizing, if said terminal is not configured with contention free random access resources, said serving cell, and/or
prioritizing, if said terminal is configured with contention free random access resources, and said configured contention free random access resources do not exceed a predetermined threshold, said serving cell, and/or
prioritizing, if said terminal is configured with contention free random access resources, and said configured contention free random access resources exceed said predetermined threshold for said serving cell, and said configured contention free random access resources do not exceed said predetermined threshold for a selected non-serving cell, said serving cell, and/or prioritizing, if said terminal is configured with contention free random access resources, and said configured contention free random access resources exceed said predetermined threshold for the serving cell and for said selected non-serving cell, said serving cell, and/or prioritizing, if said terminal is configured with contention free random access resources, and said configured contention free random access resources do not exceed said predetermined threshold for said serving cell, and said configured contention free random access resources exceed said predetermined threshold for said selected non-serving cell, said selected non-serving cell.

Aspect 71. The apparatus according to any of aspects 41 to 70, wherein
the at least one processor, with the at least one memory and the computer program code, being configured to cause the apparatus to perform:
receiving a random access channel response in relation to beam failure recovery endeavor with respect to said serving cell of said terminal and/or in relation to beam failure recovery endeavor with respect to said at least one non-serving cell of said terminal, and
stopping performance of beam failure recovery attempts with respect to said serving cell of said terminal and said at least one non-serving cell of said terminal.

Aspect 72. The apparatus according to any of aspects 41 to 71, wherein
the at least one processor, with the at least one memory and the computer program code, being configured to cause the apparatus to perform:
suppressing declaration of radio link failure and initiation of connection re-establishment until a last decided beam failure recovery attempt fails.

Aspect 73. The apparatus according to any of aspects 41 to 72, wherein
in relation to said identifying, the at least one processor, with the at least one memory and the computer program code, being configured to cause the apparatus to perform:
counting beam failure instance indications, and
comparing said counted beam failure instance indications with a predetermined beam failure instance indications threshold.

Aspect 74. An apparatus of a network entity controlling network access for a terminal, comprising
at least one processor,
at least one memory including computer program code, and
at least one interface configured for communication with at least another apparatus,
the at least one processor, with the at least one memory and the computer program code, being configured to cause the apparatus to perform:
deciding on a beam failure handling decision configuration for said terminal, and
controlling transmission of said beam failure handling decision configuration to said terminal, wherein
said beam failure handling decision configuration configures a deciding behavior of said terminal regarding performance of beam failure recovery attempts with respect to a serving cell of said terminal and at least one non-serving cell of said terminal.

Aspect 75. The apparatus according to aspect 74, wherein
said beam failure handling decision configuration comprises a serving cell attempts number of random access channel attempts to be used for beam failure recovery endeavor with respect to said serving cell of said terminal.

Aspect 76. The apparatus according to aspect 74 or 75, wherein
said beam failure handling decision configuration comprises a non-serving cell attempts number of random access channel attempts to be used for beam failure recovery endeavor with respect to said at least one non-serving cell of said terminal.

Aspect 77. The apparatus according to aspect 76, wherein
said beam failure handling decision configuration comprises a first non-serving cell attempts number of random access channel attempts to be used for beam failure recovery endeavor with respect to a first one of said at least one non-serving cell of said terminal and a second non-serving cell attempts number of random access channel attempts to be used for beam failure recovery endeavor with respect to a second one of said at least one non-serving cell of said terminal.

Aspect 78. The apparatus according to aspect 77, wherein
said beam failure handling decision configuration comprises an overall attempts number of random access channel attempts to be used for beam failure recovery endeavor with respect to said serving cell of said terminal and said at least one non-serving cell of said terminal and/or an overall number of cells to be considered for beam failure recovery endeavor with respect to said serving cell of said terminal and said at least one non-serving cell of said terminal.

Aspect 79. The apparatus according to any of aspects 74 to 78, wherein
said beam failure handling decision configuration comprises an indication to suppress declaration of radio link failure and initiation of connection re-establishment until a last decided beam failure recovery attempt fails.

Aspect 80. The apparatus according to any of aspects 74 to 79, wherein
said beam failure handling decision configuration is a random access channel ConfigGeneric information element.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for beam failure recovery enhancement. Such measures exemplarily comprise, at a terminal, identifying a beam failure with respect to a radio beam provided by a serving cell of said terminal, and deciding, in response to an identified beam failure, to perform beam failure recovery attempts including at least a first beam failure recovery attempt and a second beam failure recovery attempt with respect to said serving cell of said terminal and at least one non-serving cell of said terminal.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP Third Generation Partnership Project
5G 5th Generation (cellular technology)
BFR beam failure recovery
CBRA contention based random access
CFRA contention free random access
FR frequency range
FR2 frequency range 2
gNB gNodeB
HO handover
L1 Layer 1
L1-RSRP L1 reference signal received power
L1-SINR L1 signal to interference plus noise ratio
MAC medium access control
MIMO multiple input-multiple output
MPE maximum permissible exposure
NR New Radio
NR_FeMIMO further enhancements on MIMO for NR
PCI physical cell identity
PRACH physical random access channel
P-MPR power management maximum power reduction
QCL quasi co location
RA random access
RACH random access channel
RAN radio access network
RAR RACH response
Rel Release
RLF radio link failure
RRC radio resource control
SCell serving cell
SSB synchronization signal block
Tx transmission
TS Technical Specification
UE user equipment

The invention claimed is:
1. An apparatus comprising:
a processor; and
a memory comprising computer-executable instructions that, when executed by the processor, cause the processor to perform the following operations:
identifying a beam failure with respect to a radio beam provided by a serving cell of the apparatus;
receiving a beam failure handling decision configuration;

deciding, in response to an identified beam failure and based on the beam failure handling decision configuration, to perform beam failure recovery attempts including at least a first beam failure recovery attempt and a second beam failure recovery attempt with respect to the serving cell of the apparatus and at least one non-serving cell of the apparatus, wherein the beam failure handling decision configuration is a random access channel ConfigGeneric information element, and wherein the beam failure handling decision configuration comprises the following:
- a serving cell attempts number of random access channel attempts to be used for beam failure recovery endeavor with respect to the serving cell of the apparatus;
- a first non-serving cell attempts number of random access channel attempts to be used for beam failure recovery endeavor with respect to a first one of the at least one non-serving cell of the apparatus and a second non-serving cell attempts number of random access channel attempts to be used for beam failure recovery endeavor with respect to a second one of the at least one non-serving cell of the apparatus;
- an overall attempts number of random access channel attempts to be used for beam failure recovery endeavor with respect to the serving cell of the apparatus and the at least one non-serving cell of the apparatus and/or an overall number of cells to be considered for beam failure recovery endeavor with respect to the serving cell of the apparatus and the at least one non-serving cell of the apparatus;
- an indication to suppress declaration of radio link failure and initiation of connection re-establishment until a last decided beam failure recovery attempt fails performing, based on the deciding, the first beam failure recovery attempt with respect to the serving cell of the apparatus within a first beam failure recovery period; and performing, based on the deciding, the second beam failure recovery attempt with respect to a first non-serving cell of the at least one non-serving cell of the apparatus within a second beam failure recovery period, wherein the first beam failure recovery period is identical with the second beam failure recovery period, and wherein the second beam failure recovery attempt is performed in parallel with the first beam failure recovery attempt.

2. A system comprising:
an apparatus;
a processor; and
a memory comprising computer-executable instructions that, when executed by the processor, cause the processor to perform the following operations:
identifying a beam failure with respect to a radio beam provided by a serving cell of the apparatus;
receiving a beam failure handling decision configuration;
deciding, in response to an identified beam failure and based on the beam failure handling decision configuration, to perform beam failure recovery attempts including at least a first beam failure recovery attempt and a second beam failure recovery attempt with respect to the serving cell of the apparatus and at least one non-serving cell of the apparatus, wherein the beam failure handling decision configuration is a random access channel ConfigGeneric information element, and wherein the beam failure handling decision configuration comprises the following:
- a serving cell attempts number of random access channel attempts to be used for beam failure recovery endeavor with respect to the serving cell of the apparatus;
- a first non-serving cell attempts number of random access channel attempts to be used for beam failure recovery endeavor with respect to a first one of the at least one non-serving cell of the apparatus and a second non-serving cell attempts number of random access channel attempts to be used for beam failure recovery endeavor with respect to a second one of the at least one non-serving cell of the apparatus;
- an overall attempts number of random access channel attempts to be used for beam failure recovery endeavor with respect to the serving cell of the apparatus and the at least one non-serving cell of the apparatus and/or an overall number of cells to be considered for beam failure recovery endeavor with respect to the serving cell of the apparatus and the at least one non-serving cell of the apparatus;
- an indication to suppress declaration of radio link failure and initiation of connection re-establishment until a last decided beam failure recovery attempt fails performing, based on the deciding, the first beam failure recovery attempt with respect to the serving cell of the apparatus within a first beam failure recovery period; and performing, based on the deciding, the second beam failure recovery attempt with respect to a first non-serving cell of the at least one non-serving cell of the apparatus within a second beam failure recovery period, wherein the first beam failure recovery period is identical with the second beam failure recovery period, and wherein the second beam failure recovery attempt is performed in parallel with the first beam failure recovery attempt.

3. A method comprising:
identifying, by an apparatus, a beam failure with respect to a radio beam provided by a serving cell of the apparatus;
receiving, by the apparatus, a beam failure handling decision configuration;
deciding, by the apparatus in response to an identified beam failure and based on the beam failure handling decision configuration, to perform beam failure recovery attempts including at least a first beam failure recovery attempt and a second beam failure recovery attempt with respect to the serving cell of the apparatus and at least one non-serving cell of the apparatus, wherein the beam failure handling decision configuration is a random access channel ConfigGeneric information element, and wherein the beam failure handling decision configuration comprises the following:
- a serving cell attempts number of random access channel attempts to be used for beam failure recovery endeavor with respect to the serving cell of the apparatus;

a first non-serving cell attempts number of random access channel attempts to be used for beam failure recovery endeavor with respect to a first one of the at least one non-serving cell of the apparatus and a second non-serving cell attempts number of random access channel attempts to be used for beam failure recovery endeavor with respect to a second one of the at least one non-serving cell of the apparatus;

an overall attempts number of random access channel attempts to be used for beam failure recovery endeavor with respect to the serving cell of the apparatus and the at least one non-serving cell of the apparatus and/or an overall number of cells to be considered for beam failure recovery endeavor with respect to the serving cell of the apparatus and the at least one non-serving cell of the apparatus;

an indication to suppress declaration of radio link failure and initiation of connection re-establishment until a last decided beam failure recovery attempt fails performing, by the apparatus based on the deciding, the first beam failure recovery attempt with respect to the serving cell of the apparatus within a first beam failure recovery period; and performing, by the apparatus based on the deciding, the second beam failure recovery attempt with respect to a first non-serving cell of the at least one non-serving cell of the apparatus within a second beam failure recovery period, wherein the first beam failure recovery period is identical with the second beam failure recovery period, and wherein the second beam failure recovery attempt is performed in parallel with the first beam failure recovery attempt.

* * * * *